United States Patent
Sakurai et al.

(10) Patent No.: US 6,812,319 B2
(45) Date of Patent: Nov. 2, 2004

(54) WHOLLY AROMATIC POLYESTER CARBONATE AND PROCESS FOR PRODUCTION OF SAME

(75) Inventors: Hiroshi Sakurai, Yamaguchi (JP); Toyoaki Ishiwata, Yamaguchi (JP); Shunichi Matsumura, Yamaguchi (JP); Masayuki Chokai, Yamaguchi (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/411,116

(22) Filed: Apr. 11, 2003

(65) Prior Publication Data

US 2003/0171528 A1 Sep. 11, 2003

Related U.S. Application Data

(63) Continuation of application No. PCT/JP01/08874, filed on Oct. 10, 2001.

(30) Foreign Application Priority Data

Oct. 11, 2000 (JP) ........................................ 2000-310984
Jan. 30, 2001 (JP) ........................................ 2001-020988
Jan. 30, 2001 (JP) ........................................ 2001-020989

(51) Int. Cl.[7] ............................................. C08G 64/00
(52) U.S. Cl. ..................... 528/196; 264/176.1; 264/219; 528/198
(58) Field of Search .............................. 264/176.1, 219; 528/196, 198

(56) References Cited

U.S. PATENT DOCUMENTS

2003/0125504 A1 * 7/2003 Miyoshi et al. .............. 528/181

FOREIGN PATENT DOCUMENTS

| JP | 53-35796 A | 4/1978 |
| JP | 55-98224 A | 7/1980 |
| JP | 1-247420 A | 10/1989 |
| JP | 5-331270 A | 12/1993 |
| JP | 5-331271 A | 12/1993 |
| JP | 06-122758 A | 5/1994 |

* cited by examiner

Primary Examiner—Terressa Boykin
(74) Attorney, Agent, or Firm—Sughrue Mion, PLLC

(57) ABSTRACT

The present invention relates to a wholly aromatic polyester carbonate and a process for its production. An aromatic dicarboxylic acid, an aromatic diol, and a diaryl carbonate are used as starting materials in specific molar ratios, a prepolymerization step, a crystallization step, and a solid-phase polymerization step are essential steps, and a compression molding step is an optional step. This makes it possible to produce with good productivity a wholly aromatic polyester carbonate that has low coloration and a high degree of polymerization.

40 Claims, 1 Drawing Sheet

WHOLLY AROMATIC POLYESTER CARBONATE AND PROCESS FOR PRODUCTION OF SAME

CROSS-REFERENCES TO RELATED APPLICATIONS

This is a Continuation of International Application PCT/JP01/08874 with an international filing date of Oct. 10, 2001, which was published under PCT Article 21(2) in WO 02/31022, and the disclosure of which is incorporated into this application by reference.

BACKGROUND OF THE INVENTION

1. Field of the Invention

The present invention relates to a process for the production of a wholly aromatic polyester carbonate. More particularly, it relates to a process for producing, with good productivity, a wholly aromatic polyester carbonate that has low coloration and a high degree of polymerization by combining a prepolymerization step, a crystallization step, and a solid-phase polymerization step using a specific aromatic dicarboxylic acid, aromatic diol, and diaryl carbonate as starting materials.

Furthermore, the present invention relates to a wholly aromatic polyester carbonate. More particularly, it relates to a wholly aromatic polyester carbonate that has specific terminal groups, and has low coloration and a high degree of polymerization.

2. Description of the Related Art

In recent years, there has been a desire for enhanced performance in engineering plastics having high heat resistance and excellent mechanical strength. Amorphous engineering plastics include polyarylates and polycarbonates.

Wholly aromatic polyesters (polyarylates) have excellent heat resistance and chemical resistance, but have the problems that the melt viscosity is high and the moldability is poor. On the other hand, aromatic polycarbonates are inferior in terms of heat resistance and chemical resistance, but their moldability is excellent and they find widespread application. By introducing a carbonate bond into a wholly aromatic polyester, the effect of improving the flowability of the wholly aromatic polyester can be expected, and it is therefore important to develop a process for the production of such an aromatic polyester carbonate.

With regard to a process for the production of an aromatic polyester carbonate, a melt polymerization method has been known for a long time, but since the viscosity increases during the second half of the reaction it is difficult to obtain a polymer having a high degree of polymerization. Furthermore, since the polymerization reaction is carried out at high temperature, there is the problem that coloration occurs.

Because of this, a solid-phase polymerization method for an aromatic polyester carbonate has been investigated. The solid-phase polymerization method is a method that involves synthesis of a prepolymer having a certain degree of polymerization by melt polymerization, crystallization of the prepolymer by means of heating, treating with a solvent, etc., and subsequent polymerization in a solid phase.

As one example of the solid-phase polymerization method for an aromatic polyester carbonate, a method in which a dicarboxylic acid, a diol, and a diaryl carbonate are subjected to a hot-melt reaction to give a prepolymer, which is then subjected to a solid-phase polymerization has been reported (JP-A-55-98224 (JP-A denotes a Japanese unexamined patent application publication)). In this method, however, the solubility of the aromatic dicarboxylic acid is low, dissolving the dicarboxylic acid is thus a rate-determining step, and since the reaction must be carried out at high temperature and requires a long period of time, there is a limit to the improvement in the coloration.

On the other hand, consideration has also been given to crystallizing the prepolymer and then subjecting it to solid-phase polymerization. With regard to crystallization of a polyacrylate prepolymer, a method in which treatment is carried out using a specific crystallizing agent has been reported (JP-A-5-331270 and JP-A-5-331271). However, this method employs an excess amount of crystallizing agent relative to the prepolymer, and removal of this crystallizing agent entails considerable expense.

With regard to other methods for crystallizing the prepolymer, a method in which the prepolymer in a molten state is cooled to a temperature at which crystallization proceeds at a sufficiently high speed, a method in which it is heated from room temperature to that temperature (JP-A-53-35796), etc. have been reported. However, in these methods, since the prepolymer has a long thermal history, there is the problem of progressive coloration of the prepolymer.

With regard to solid-phase polymerization methods for a wholly aromatic polyester, for example, methods have been reported in which an aromatic diol and a diaryl aromatic dicarboxylate ester are reacted (JP-A-5-331270), or an aromatic diol ester derivative and an aromatic dicarboxylic acid are reacted (JP-A-5-331271) to give a prepolymer, which is then crystallized in a crystallizing solvent by applying high shear, followed by a solid-phase polymerization.

However, all these methods require esterification of a starting material in advance, and there is the problem of high cost.

With regard to solid-phase polymerization methods for an aromatic polyester carbonate, there are methods in which a prepolymer is produced from an aromatic diol, an aromatic dicarboxylic acid, and a diaryl carbonate, and the prepolymer thus obtained is crystallized and then subjected to solid-phase polymerization (JP-A-1-247420, etc.). However, in these methods, since the crystallized prepolymer used in the solid-phase polymerization is in the form of a powder, there is a serious problem in handling during the process. In addition, there is a limit to reducing the solid-phase polymerization time in the solid-phase polymerization method employing a crystallized prepolymer in the form of a powder.

As described above, it has been difficult in practice to produce a high molecular weight polymer in a short period of time with low cost and without any problems in handling by the conventionally known solid-phase polymerization method for a wholly aromatic polyester carbonate.

BRIEF SUMMARY OF THE INVENTION

It is a first object of the present invention to provide an industrial and economical production process for obtaining a high molecular weight wholly aromatic polyester carbonate that is transparent and has low coloration, has good physical properties, and can melt at a comparatively low temperature to become amorphous, using an aromatic dicarboxylic acid, an aromatic diol, and a diaryl carbonate as starting materials directly without needing to esterify the aromatic dicarboxylic acid and aromatic diol in advance. Furthermore, it is to provide a process for the production of a wholly aromatic polyester carbonate, in which handling in the production steps is easy, and the time required for solid-phase polymerization is short.

Moreover, it is a second object of the present invention to provide a high molecular weight wholly aromatic polyester carbonate having a specific terminal group, and which is transparent, has low coloration and good physical properties, and can melt at a comparatively low temperature to become amorphous.

The above-mentioned objects are accomplished by the following means.

A first aspect of the present invention relates to a process for the production of a wholly aromatic polyester carbonate as follows.

A process for the production of a wholly aromatic polyester carbonate using three components, that is, an aromatic diol component (a) represented by formula (I) below $$HO—Ar^1—X—Ar^2—OH \quad (I)$$

{in formula (I), $Ar^1$ and $Ar^2$ are each phenylene groups, which may be substituted, and X is a divalent organic group represented by formula (II) below

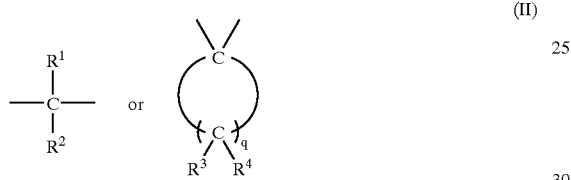

(here, $R^1$, $R^2$, $R^3$, and $R^4$ are each independently chosen from the group consisting of a hydrogen atom, a halogen atom, an alkyl group having 1 to 6 carbons, a cycloalkyl group having 5 or 6 carbons, an aryl group having 6 to 12 carbons, and an aralkyl group having 7 to 12 carbons, q denotes an integer of 4 to 10, and q each of $R^3$ and $R^4$ may be identical or different)}, an aromatic dicarboxylic acid component (b), and a diaryl carbonate (c) in molar ratios that simultaneously satisfy expressions (1), (2), and (3) below $$A:B:C=(1+X_1):1:(2+X_2) \quad (1)$$

$$0.9 \leq C/(A+B) \leq 1.1 \quad (2)$$

$$0.5 \leq X_2/X_1 \leq 1.5 \quad (3)$$

(in the expressions, A denotes the number of moles of the aromatic diol component (a), B denotes the number of moles of the aromatic dicarboxylic acid component (b), and C denotes the number of moles of the diaryl carbonate (c). $X_1$ and $X_2$ denote any number that is larger than 0 and at most 0.5, and may be identical or different), characterized in that a high molecular weight polymer is obtained by carrying out, in sequence, 1) a prepolymerization step in which a prepolymer is prepared by prepolymerizing the three components, that is, the above-mentioned aromatic diol component (a), aromatic dicarboxylic acid component (b), and diaryl carbonate (c) while heating at a temperature of at least 180° C. using, as the aromatic dicarboxylic acid component (b), terephthalic acid (b') alone or an aromatic dicarboxylic acid component mixture (b") of terephthalic acid and isophthalic acid at a molar ratio that satisfies expression (4) below $$0 \leq IA/TA < 1 \quad (4)$$

(in the expression, TA and IA are the numbers of moles of terephthalic acid and isophthalic acid, respectively), 2) a crystallization step in which the prepolymer is crystallized to prepare a crystallized prepolymer, and 3) a solid-phase polymerization step in which the degree of polymerization of the crystallized prepolymer is increased.

Furthermore, a second aspect of the present invention relates to a wholly aromatic polyester carbonate as follows.

A wholly aromatic polyester carbonate characterized in that a repeating unit represented by formula (V) below

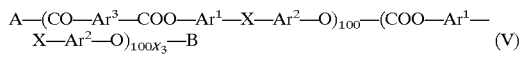

{in formula (V), $Ar^1$ and $Ar^2$ are each phenylene groups, which may be substituted, $Ar^3$ is an aromatic group, which may be substituted, X is a divalent organic group represented by formula (II) below

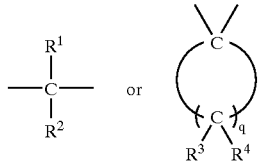

(here, $R^1$, $R^2$, $R^3$, and $R^4$ are each independently chosen from the group consisting of a hydrogen atom, a halogen atom, an alkyl group having 1 to 6 carbons, a cycloalkyl group having 5 or 6 carbons, an aryl group having 6 to 12 carbons, and an aralkyl group having 7 to 12 carbons, q denotes an integer of 4 to 10, and q each of $R^3$ and $R^4$ may be identical or different), and $X_3$ is a number greater than 0 and at most 0.5} is random copolymerized, and terminal groups A and B of the molecule are groups chosen from the group consisting of an aryloxy group, which may be substituted with a halogen atom or a methyl group, a hydroxyaryl group, which may have a substituent, and a carboxyaryl group, which may be substituted.

DETAILED DESCRIPTION OF THE INVENTION

Figure 1:
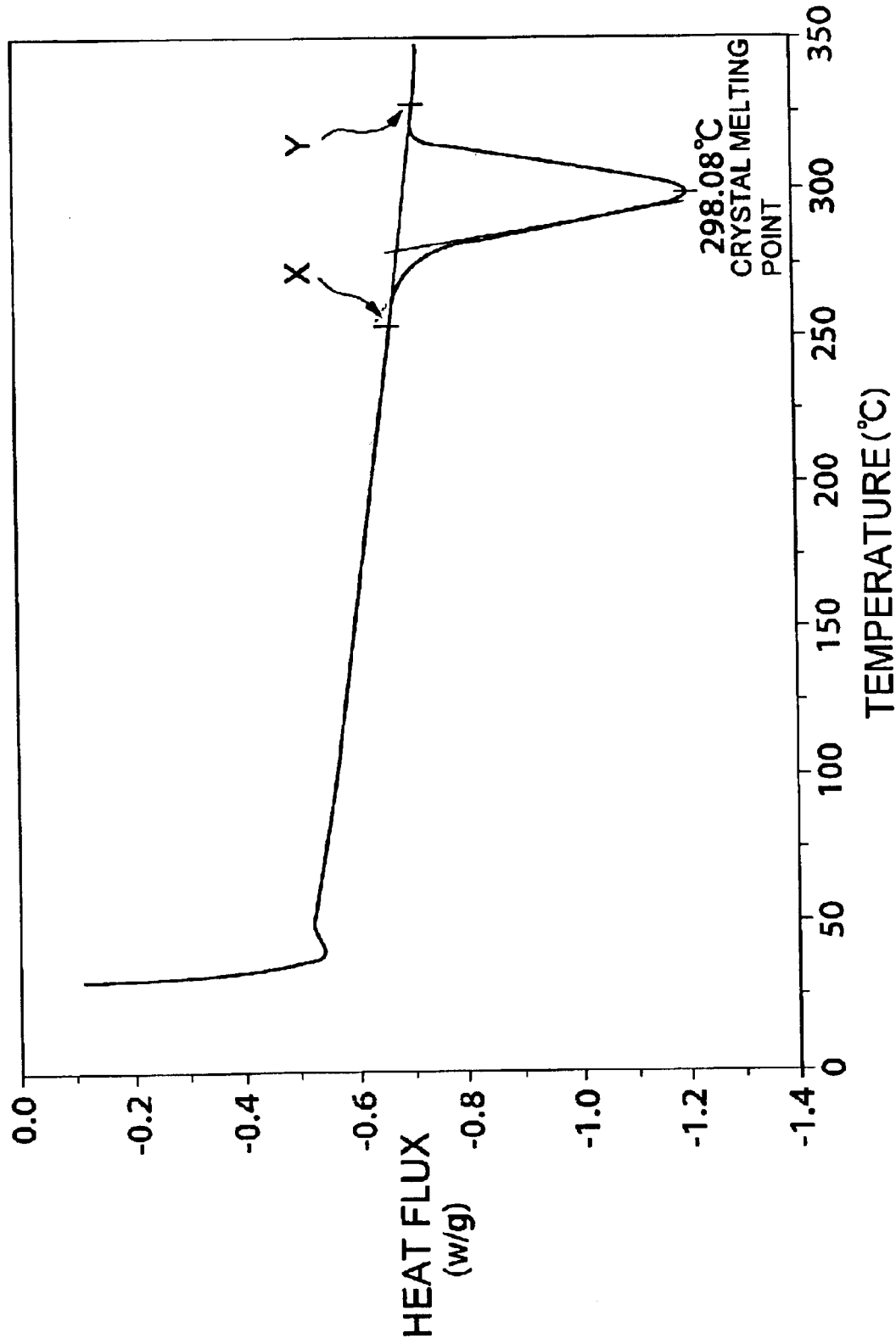
FIG. 1 is a graph showing a DSC (Differential Scanning Calorimeter) curve.

The production process of the present invention is explained in detail below. Explanations are given of the starting monomers and, in addition to the prepolymerization step, the crystallization step, and the solid-phase polymerization step, which are essential steps, a pulverization step, a compression molding step, and a crushing step, which are optional steps.

(Starting Monomers, etc.)

The aromatic diol component (a), the aromatic dicarboxylic acid component (b), and the diaryl carbonate (c) used in the present invention are explained.

The aromatic diol component (a) is an aromatic dihydroxy compound represented by formula (I) below.

$$HO—Ar^1—X—Ar^2—OH \quad (I)$$

{In formula (I), $Ar^1$ and $Ar^2$ are each independently phenylene groups, in which a benzene ring hydrogen atom may be substituted. Allowable substituents for the phenylene groups are atoms or organic groups that do not interfere with condensation polymerization for the wholly aromatic polyester carbonate, and an alkyl group having 1 to 4 carbons and a halogen atom (in particular, a chlorine atom and a bromine atom) can be cited.

X is a divalent organic group represented by formula (II) below.

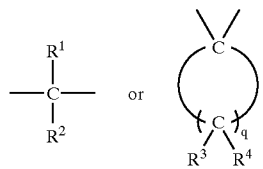

(II)

(Here, $R^1$, $R^2$, $R^3$, and $R^4$ are each independently chosen from the group consisting of a hydrogen atom, a halogen atom such as chlorine or bromine, an alkyl group having 1 to 6 carbons such as methyl, ethyl or propyl, a cycloalkyl group having 5 or 6 carbons such as cyclopentyl or cyclohexyl, an aryl group having 6 to 12 carbons such as phenyl, and an aralkyl group having 7 to 12 carbons such as benzyl, q denotes an integer of 4 to 10, and q each of $R^3$ and $R^4$ may be identical or different.)}

Examples of such an aromatic diol component (a) include 2,2-bis(4-hydroxyphenyl)propane, 1,1-bis(4-hydroxyphenyl)cyclohexane, 2,2-bis(3-methyl-4-hydroxyphenyl)propane, 2,2-bis(3,5-dimethyl-4-hydroxyphenyl)propane, and 2-(4-hydroxyphenyl)-2-(3,5-dichloro-4-hydroxyphenyl)propane, and among these 2,2-bis(4-hydroxyphenyl)propane, 1,1-bis(4-hydroxyphenyl)cyclohexane, and 2,2-bis(3-methyl-4-hydroxyphenyl) propane are preferable. A combination of two or more types of these aromatic diol components may be used at the same time.

With regard to the aromatic dicarboxylic acid component (b), terephthalic acid, isophthalic acid, methylterephthalic acid, methylisophthalic acid, naphthalene-2,6-dicarboxylic acid, naphthalene-2,7-dicarboxylic acid, diphenyldicarboxylic acid, diphenyletherdicarboxylic acid, diphenylsulfonedicarboxylic acid, etc. can be cited, and among these it is preferable to use terephthalic acid alone (b') or an aromatic dicarboxylic acid mixture (b") of terephthalic acid and isophthalic acid at a molar ratio that satisfies expression (4) below.

$$0 \leq IA/TA < 1 \qquad (4)$$

(In the expression, TA and IA are the numbers of moles of terephthalic acid and isophthalic acid, respectively.)

Furthermore, part of the terephthalic acid may be replaced with an aromatic dicarboxylic acid such as naphthalene-2,6-dicarboxylic acid, diphenyl-2,2'-dicarboxylic acid, diphenyl-4,4'-dicarboxylic acid, diphenylether-4,4'-dicarboxylic acid, or diphenylsulfone-4,4'-dicarboxylic acid.

With regard to the diaryl carbonate (c), for example, diphenyl carbonate, di-p-tolyl carbonate, dinaphthyl carbonate, di-p-chlorophenyl carbonate, phenyl-p-tolyl carbonate, etc. can be cited, and among these diphenyl carbonate is particularly preferable. The diaryl carbonate may have a substituent, and may be used singly or in a combination of two or more types. Allowable substituents for the two aryl groups of the diaryl carbonate are atoms or organic groups that do not interfere with condensation polymerization for the wholly aromatic polyester carbonate, and an alkyl group having 1 to 4 carbons and a halogen atom (in particular, a chlorine atom, and a bromine atom) can be cited.

(Prepolymerization Step)

The prepolymerization step of the present invention is explained.

In the production process of the present invention, firstly the above-mentioned aromatic diol component (a), aromatic dicarboxylic acid component (b), and diaryl carbonate (c) are used in the prepolymerization in molar ratios that simultaneously satisfy expressions (1), (2), and (3) below.

$$A:B:C=(1+X_1):1:(2+X_2) \qquad (1)$$

$$0.9 \leq C/(A+B) \leq 1.1 \qquad (2)$$

$$0.5 \leq X_2/X_1 \leq 1.5 \qquad (3)$$

(In the expressions, A denotes the number of moles of the aromatic diol component (a), B denotes the number of moles of the aromatic dicarboxylic acid component (b), and C denotes the number of moles of the diaryl carbonate (c). $X_1$ and $X_2$ denote any number that is larger than 0 and at most 0.5, and may be identical or different.)

In this case, it is preferable to use, as the aromatic dicarboxylic acid component (b), terephthalic acid (b') alone or an aromatic dicarboxylic acid mixture (b") of terephthalic acid and isophthalic acid at a molar ratio that satisfies expression (4) below.

$$0 \leq IA/TA < 1 \qquad (4)$$

(In the expression, TA and IA are the numbers of moles of terephthalic acid and isophthalic acid, respectively.)

The above-mentioned expression (1) represents the molar ratios of the aromatic diol component (a), the aromatic dicarboxylic acid component (b), and the diaryl carbonate (c) initially charged. When $X_1$ and $X_2$ are 0, the color tone of the polymer deteriorates greatly, which is undesirable. When they are greater than 0.5, the heat resistance of the polymer that is finally obtained deteriorates, which is undesirable.

If the molar ratio (A/B) of the aromatic diol component (a) to the aromatic dicarboxylic acid component (b) is 1, then the polymer obtained is a wholly aromatic polyester substantially comprising a repeating unit represented by formula (VI) below.

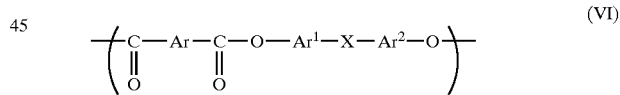

(VI)

(In formula (VI), Ar denotes the aromatic group of the aromatic dicarboxylic acid component (b); $Ar^1$, $Ar^2$, and X are the same as $Ar^1$, $Ar^2$, and X in formula (I).)

On the other hand, if the amount of aromatic diol component (a) is larger than the amount of aromatic dicarboxylic acid component (b), more specifically, if $1<A/B \leq 1.5$, then the polymer obtained is a wholly aromatic polyester carbonate comprising a repeating unit represented by the above-mentioned formula (VI) and a repeating unit represented by formula (VII) below.

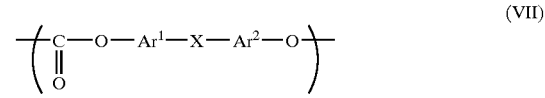

(VII)

(In formula (VIII), $Ar^1$, $Ar^2$, and X are the same as $Ar^1$, $Ar^2$, and X in formula (I).)

The wholly aromatic polyester carbonate referred to in the present invention denotes one in which the ratio (A/B) of the aromatic diol component (a) to the aromatic dicarboxylic acid component (b) is in the range of $1<A/B\leq1.5$.

On the other hand, the above-mentioned expression (2) represents the ratio of the number of moles of the diaryl carbonate (c) to the total number of moles of the aromatic diol component (a) and the aromatic dicarboxylic acid component (b). When this ratio C/(A+B) is less than 0.9, then polymerization to produce the polymer easily becomes slow; when it is larger than 1.1, the polymer obtained has intense coloration, and neither case is desirable. In the above-mentioned expression (2), the range $0.95\leq C/(A+B)\leq1.05$ is preferable,
the range $0.96\leq C/(A+B)\leq1.04$ is more preferable, and
the range $0.97\leq C/(A+B)\leq1.03$ is most preferable.

The above-mentioned expression (3) represents the ratio of the number of moles of $X_1$ to the number of moles of $X_2$ in the above-mentioned expression (1). When $X_2/X_1$ is less than 0.5, then polymerization to produce the polymer easily becomes slow; when it is larger than 1.5, the polymer obtained has intense coloration, and neither case is desirable. In the above-mentioned expression (3), the range $0.9\leq X_2/X_1\leq1.3$ is more preferable, and the range $0.7\leq X_2/X_1\leq1.1$ is most preferable.

The above-mentioned expression (4) represents the ratio of the number of moles of terephthalic acid to the number of moles of isophthalic acid. When IA/TA is 1 or above, a long time is required for the step in which the prepolymer obtained is crystallized, which is undesirable. In the above-mentioned expression (4), the range $0\leq IA/TA\leq0.8$ is more preferable, and the range $0\leq IA/TA\leq0.7$ is most preferable.

Furthermore, in the crystallization step described below, when crystallizing by heating the prepolymer obtained in the prepolymerization step 1), it is preferable for the range in the above-mentioned expression (4) to be $0.25\leq IA/TA\leq0.67$, more preferably $0.33\leq IA/TA\leq0.60$, and most preferably $0.35\leq IA/TA\leq0.58$.

If the IA/TA ratio is greater than 0.67, then a long time is required for crystallization of the prepolymer obtained, which is undesirable. On the other hand, when it is less than 0.25, although crystallization proceeds sufficiently quickly, in order to prevent crystallization of prepolymer during the prepolymerization, it is necessary to carry out the prepolymerization at a temperature higher than 320° C., and as a result there is undesirable coloration.

The prepolymerization step 1) of the present invention is carried out by subjecting the above-mentioned aromatic diol component (a), aromatic dicarboxylic acid component (b), and diaryl carbonate (c) to prepolymerization under heating at 180° C. or above. It is necessary for the temperature of the prepolymerization to be at least 180° C. That is, when the temperature is less than 180° C., then the polymerization rate of the prepolymerization becomes slow, which is undesirable. The final temperature of the prepolymerization is preferably 200° C. to 350° C., more preferably 200° C. to 330° C., and yet more preferably 220° C. to 320° C.

Next, a pyridine compound and a titanium compound preferably used in the prepolymerization step of the production process of the present invention are explained.

In the prepolymerization step 1) of the present invention, the reaction is preferably carried out in the presence of a specific pyridine compound represented by formula (III) below

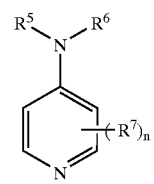

(in formula (III), $R^5$ and $R^6$ are independently chosen from the group consisting of an alkyl group having 1 to 6 carbons, a cycloalkyl group having 5 to 10 carbons, an aryl group having 6 to 12 carbons, and an aralkyl group having 7 to 12 carbons, $R^5$ and $R^6$ may be bonded to each other and, together with the nitrogen atom to which they are bonded, form a 5 to 7 membered heterocyclic group, $R^7$ is chosen from the group consisting of an alkyl group having 1 to 6 carbons, a cycloalkyl group having 5 to 10 carbons, an aryl group having 6 to 12 carbons, and an aralkyl group having 7 to 12 carbons, and n denotes an integer of 0 to 4), or a specific titanium compound represented by formula (IV) below.

$$Ti(OR^8)_p(OR^9)_m \qquad (IV)$$

(In formula (IV) above, $R^8$ is chosen from the group consisting of an alkyl group having 1 to 6 carbons, a cycloalkyl group having 5 to 10 carbons, and an aralkyl group having 7 to 12 carbons, $R^9$ is an aryl group having 6 to 12 carbons, and each of p and m is 0 or an integer of 1 to 4 such that p+m=4.)

Examples of the pyridine compound represented by formula (III) above include 4-aminopyridine, 4-dimethylaminopyridine, 4-diethylaminopyridine, 4-pyrrolidinopyridine, 4-piperidinopyridine, 4-pyrrolinopyridine, and 2-methyl-4-dimethylaminopyridine. Among these, 4-dimethylaminopyridine and 4-pyrrolidinopyridine are particularly preferable.

Examples of the specific titanium compound represented by formula (IV) above include tetraphenoxytitanium, butoxytriphenoxytitanium, dibutoxydiphenoxytitanium, tetrabutoxytitanium, tetracresoxytitanium, ethoxytricresoxytitanium, and diethoxydicresoxytitanium, and among these tetraphenoxytitanium and tetrabutoxytitanium are particularly preferable.

In order to increase the rate of polymerization of the solid-phase polymerization step, it is also possible to use a conventionally known ester exchange catalyst, etc. at the same time in the prepolymerization step 1).

In this prepolymerization reaction, firstly the diaryl carbonate reacts mainly with the aromatic dicarboxylic acid component and the aromatic diol component, and a phenol and carbon dioxide are generated. In general, the aromatic dicarboxylic acid has low solubility and a high melting point; a high temperature is required to start this initial reaction and, furthermore, a long period of time is required to complete the initial reaction. Because of this, in the conventional process the color tone of the polymer obtained deteriorates, and a large amount of a sublimate is formed during the reaction.

However, it has been found that when a compound represented by formula (III) or (IV) above is used as a catalyst, this initial reaction can start at a very low temperature in a very short period of time. It is surmised that, because of this, the time required for the prepolymerization becomes short, and the hue of the polymer obtained is outstandingly improved.

The amounts of the pyridine compound (III) and the titanium compound (IV) used are not particularly limited, but in the case of the pyridine compound (III), the amount thereof used is preferably 0.001 mol to 10 mol relative to 100 mol of the above-mentioned aromatic dicarboxylic acid component (b). When it is less than 0.001 mol, the catalytic effect of the compound is inadequate. When it is more than 10 mol, the physical properties of the polymer obtained might be degraded, which is undesirable. It is more preferably 0.005 mol to 10 mol, yet more preferably 0.005 mol to 1 mol, and most preferably 0.05 mol to 1 mol. The compound (III) may be used in the form of an organic acid salt or an inorganic acid salt.

On the other hand, in the case of the titanium compound (IV), the amount is preferably 0.0001 to 2 mol relative to 100 mol of the above-mentioned aromatic dicarboxylic acid component (b), and more preferably 0.0005 to 0.05 mol.

Although it is not particularly limited, the prepolymerization step 1) of the present invention is preferably carried out at atmospheric pressure or under reduced pressure. At atmospheric pressure, it is preferable to use an atmosphere of an inert gas such as, nitrogen, argon, or carbon dioxide.

The reduced viscosity of the prepolymer used in the present invention depends on the composition of the polymer and the degree of polymerization finally required, but in the case where crystallization is effected in the crystallization step described below by a heating crystallization step in which the prepolymer obtained in the prepolymerization step is crystallized merely by heating, the reduced viscosity is preferably 0.05 to 0.3 dL/g, and more preferably 0.10 to 0.25 dL/g. In the case where crystallization is effected in the crystallization step by a solvent crystallization step in which the prepolymer obtained in the prepolymerization step is crystallized using a crystallizing solvent, the reduced viscosity is preferably 0.1 to 0.5 dL/g, and more preferably 0.15 to 0.5 dL/g. When the reduced viscosity exceeds the above-mentioned upper limit values, it becomes difficult to crystallize the prepolymer, and since the upper limit of the heat absorption temperature range associated with crystal melting of the crystallized prepolymer obtained is higher than 320° C., coloration is undesirably caused due to production at high temperature. When it is lower than the above-mentioned lower limit values, the time taken for the solid-phase polymerization becomes long, which is undesirable.

The reduced viscosity referred to in the present invention is a value measured in a phenol/1,1,2,2-tetrachloroethane solvent mixture (ratio by weight 60/40) at a concentration of 1.2 g/100 mL at 35° C.

(Crystallization Step)

Subsequently, in the present invention the prepolymer of the wholly aromatic polyester carbonate obtained in the above-mentioned prepolymerization step 1) is crystallized.

It is preferable in the present invention to prepare a crystallized prepolymer having a crystal melting point of 180° C. or above when using a DSC (Differential Scanning Calorimeter) with a temperature rise of 10° C./min. The upper limit of the crystal melting point is preferably 350° C.

It is more preferable in the present invention to prepare a crystallized prepolymer having a melting point of 180° C. or above and a crystal heat of fusion of 0.5 to 60 J/g in a DSC by regulating crystallization conditions in the crystallization step 2). The melting point of the crystallized prepolymer is preferably at least 200° C. and the crystal heat of fusion is 1 to 50 J/g, and more preferably the melting point of the crystallized prepolymer is at least 220° C. and the crystal heat of fusion is 5 to 30 J/g.

Methods for crystallizing the prepolymer are explained in detail. The crystallization step can be broadly divided into a heating crystallization step in which no crystallizing solvent is used and a solvent crystallization step in which a crystallizing solvent is used. Specifically, methods (A) to (I) listed below, etc. can be employed.

Method (A): the prepolymer is taken out in a molten state and gradually cooled.

Method (B): the prepolymer that has been taken out in a molten state and rapidly cooled is subjected to a thermal treatment at 150° C. to 350° C.

Method (C): the prepolymer is crystallized by maintaining the prepolymer at the glass transition temperature thereof or above.

Method (D): the prepolymer is crystallized by applying shear thereto at the glass transition temperature thereof or above.

Method (E): the prepolymer is crystallized by immersing it in a crystallizing solvent at the glass transition temperature of the prepolymer or below.

Method (F): the prepolymer that has been taken out in a molten state and rapidly cooled is crystallized by treating it with a crystallizing solvent.

Method (G): the prepolymer that has been taken out in a molten state is crystallized by treating it with a crystallizing solvent.

Method (H): the prepolymer that has been taken out in a molten state is crystallized by immediately treating it with a crystallizing solvent.

Method (I): the prepolymer is crystallized by adding 5 to 150 parts by weight of a crystallizing solvent relative to 100 parts by weight of the prepolymer and kneading at the boiling point of the crystallizing solvent or below.

Among these, Methods (A) to (D) are heating crystallization steps and Methods (E) to (I) are solvent crystallization steps. It is also possible to combine these crystallization methods.

Since the 'glass transition temperature of the prepolymer' might increase gradually accompanying progress of the crystallization, strictly speaking, the 'glass transition temperature of the prepolymer' referred to means not only the glass transition temperature of the prepolymer immediately after the prepolymerization step is completed, but also the glass transition temperature of the prepolymer as crystallization is progressing in the crystallization step 2).

In reality, using the glass transition temperature of the prepolymer prior to the crystallization (that is, that obtained in the prepolymerization step 1)) can substantially satisfy the conditions for the glass transition temperature.

(Heating Crystallization Step)

A preferable embodiment of the heating crystallization step is described below.

This crystallization step is carried out at atmospheric pressure or under reduced pressure. At atmospheric pressure, it is preferable to use an atmosphere of an inert gas such as nitrogen, argon, or carbon dioxide.

In the present step, prepolymer that is taken out in a molten state is preferably subjected to a thermal treatment at 150 to 350° C.

More preferably, the prepolymer that is taken out in a molten state is cooled and crystallized in a temperature range of 160 to 280° C. The crystallization temperature of the prepolymer depends on the compositional ratio and the degree of polymerization, but when the temperature is lower than 160° C. or higher than 280° C., the crystallization becomes very slow, which is undesirable. A preferable range is from at least 170° C. to at most 240° C.

In the present step, it is preferable to carry out crystallization of the prepolymer while, for example, adding a seed or applying an external force such as shear during the crystallization.

In the present step, it is also preferable to carry out crystallization while applying shear at the glass transition temperature of the prepolymer, or above.

It is particularly preferable to carry out crystallization of the wholly aromatic polyester carbonate prepolymer obtained in the above-mentioned prepolymerization step 1) while applying shear thereto at a rotational speed that is greater than 0 and less than 60 rpm at a temperature that is at least the glass transition temperature of the prepolymer and at most 280° C.

In the case where no shear is applied, that is, in the case where crystallization is carried out at 0 rpm, crystallization takes longer than in the case where shear is applied.

On the other hand, when shear is applied at a high rotational speed of 60 rpm or above, radicals are generated due to scission of the main chain of the prepolymer, etc., and as a result a branched structure might be caused. Furthermore, the degree of crystallization easily becomes very high, and a long period of time might be required for achieving a target degree of polymerization in the subsequent solid-phase polymerization step 3), which is undesirable.

It is more preferable for the rotational speed of shear causing crystallization of the prepolymer to be less than 50 rpm.

In the present step, shear is applied to the prepolymer while a part or the whole thereof is in a molten state. A typical state is a state in which solid particles are wrapped with molten material. In the present invention such a state is included in the molten state.

A device that applies shear to the molten prepolymer is not particularly limited, but a method in which the molten prepolymer is extruded by means of a single shaft or twin shaft extruder, etc. while crystallizing, a method in which it is crystallized while melt-kneading by means of a device having a kneader and a stirrer, a method in which it is extruded by means of an injector, an extruder, etc., a method in which the prepolymer is crystallized by passing it through a pipe device comprising a piston for extruding the prepolymer, etc. can be cited as examples.

In the present invention, the time during which shear is applied to the prepolymer is preferably 60 minutes or less. When it is longer than this range, coloration and a branched structure are often undesirably caused. More preferably it is 10 minutes or less, and yet more preferably it is 5 minutes or less.

Although it is difficult to determine a single lower limit for the rotational speed of shear and the period of time during which shear is applied, it can be easily determined by experiment, etc.

Whether or not the crystallization is proceeding by shearing can be judged visually by the cloudiness of the crystallized prepolymer obtained in the case where a colorant, etc. is not contained in the crystallized prepolymer, which is a preferable mode in the production process of the present invention. When carrying out actual production, it is therefore useful to judge in this way according to whether or not the prepolymer becomes cloudy. The cloudiness referred to here means a state in which cloudiness can be detected in the prepolymer by visual observation, etc. and it is no longer transparent.

In the present step, it is preferable to set the temperature at which shear is applied so that it is at least the glass transition temperature of the prepolymer obtained in the prepolymerization step 1) and at most 280° C.

The temperature required for shearing crystallization of the prepolymer depends on the compositional ratio and the degree of polymerization, but when the temperature is lower than the glass transition temperature of the prepolymer or higher than 280° C., the crystallization often becomes very slow, which is undesirable. A preferable temperature range is from at least a temperature that is higher by 30° C. than the glass transition temperature of the prepolymer to at most 270° C., and more preferably from at least a temperature that is higher by 40° C. than the glass transition temperature of the prepolymer to at most 260° C.

In the present step, the temperature at which shear is applied to the prepolymer obtained in the prepolymerization step 1) can be achieved either by cooling from a temperature higher than 280° C. or by heating from a temperature lower than the glass transition temperature of the prepolymer.

In the present step, in order to promote crystallization while shear is being applied to the prepolymer, a seed such as a crystallized wholly aromatic polyester carbonate or various types of metal salt can be added.

In the present invention it is preferable, by regulating the crystallization conditions of this heating crystallization step, to prepare a crystallized prepolymer in which the heat absorption temperature range associated with crystal melting of the crystallized prepolymer is from at least 180° C. to at most 320° C. when using a DSC (Differential Scanning Calorimeter) with a temperature rise of 10° C./min, and it is more preferable to prepare a crystallized prepolymer in which the heat absorption temperature range is from at least 180° C. to at most 320° C. and the crystal heat of fusion is 0.5 to 60 J/g.

The heat absorption temperature range associated with crystal melting of the crystallized prepolymer and the crystal heat of fusion can be controlled by the compositional ratio, the degree of polymerization, and the crystallization method, and when the lower limit of the heat absorption temperature range is less than 180° C., since the polymerization temperature of the solid-phase polymerization cannot be increased to 180° C. or higher, as a result the polymerization time often becomes undesirably long.

On the other hand, it becomes higher than 320° C. as a result of the prepolymerization having been carried out at a temperature higher than 320° C., and coloration is often undesirably caused as a result. The heat absorption temperature range associated with crystal melting of the crystallized prepolymer is preferably from at least 182° C. to at most 310° C., and more preferably from at least 185° C. to at most 300° C.

When the crystal heat of fusion of the crystallized prepolymer is less than 0.5 J/g, fusion of the prepolymer can occur in the solid-phase polymerization step 3).

On the other hand, when it exceeds 60 J/g, since the rate of solid-phase polymerization becomes very low, as a result the polymerization time often becomes undesirably long. The crystal heat of fusion of the crystallized prepolymer is preferably 1 to 50 J/g, and more preferably 3 to 30 J/g.

In this heating crystallization step, no crystallizing solvent (mainly liquid at room temperature) is used when crystallizing the prepolymer. It is therefore possible to omit a step of removing the crystallizing solvent and move on to the subsequent solid-phase polymerization step 3).

Furthermore, in comparison with methods in which the prepolymer is maintained at a specific temperature and crystallized without applying shear, the method in which shear is applied can crystallize the prepolymer in a comparatively short period of time and is an industrially very useful method.

(Solvent Crystallization Step)

A preferable embodiment of the solvent crystallization step is now explained.

In the case where crystallization is carried out by the solvent crystallization process, the prepolymer that is taken out in a molten state is crystallized by treating it with a crystallizing solvent. Specifically, a method in which the crystallizing solvent is added to the prepolymer, and the prepolymer and the crystallizing solvent are kneaded can be cited.

Examples of the crystallizing solvent used in the present step include ketones such as acetone, methyl ethyl ketone, and methyl isobutyl ketone, esters such as ethyl acetate, ethers such as tetrahydrofuran and dioxane, aromatic hydrocarbons such as benzene, toluene, and xylene, alcohols such as phenol and ethanol, amides such as dimethylformamide, and carbon dioxide in a supercritical state.

Among the crystallizing solvents, acetone, methyl ethyl ketone, phenol, and supercritical carbon dioxide are particularly preferable. Furthermore, from the viewpoint of not substantially reacting with the prepolymer, not substantially dissolving the prepolymer, and being easily removed, acetone and methyl ethyl ketone are particularly preferable, and acetone is most preferable.

In the present step, it is preferable to carry out crystallization by adding the crystallizing solvent to the prepolymer at 5 to 150 parts by weight relative to 100 parts by weight of the prepolymer and mixing the crystallizing solvent and the prepolymer. It is also preferable to mix at the boiling point of the crystallizing solvent or below, and it is more preferable to mix at a temperature in a range of 5 to 50° C. lower than the boiling point of the crystallizing solvent.

In the present step, it is also preferable to provide, as a step prior to crystallization, a pulverization step in which the wholly aromatic polyester carbonate prepolymer obtained in the above-mentioned prepolymerization step 1) is pulverized into a particle size of 5 mm or less. That is, if the particle size of the prepolymer is larger than 5 mm, then it takes a long time to crystallize, which is undesirable. It is preferably 3 mm or less, and more preferably 2 mm or less. The pulverization method is not particularly limited, and a conventional method can be employed.

With regard to the particle size referred to in the present invention, for example, when it is stated that 'the particle size is 5 mm', it means that the particles can pass through a sieve having a square mesh size of 5 mm×5 mm.

Furthermore, it is preferable to prepare the crystallized prepolymer by adding 5 to 150 parts by weight of the crystallizing solvent to 100 parts by weight of the pulverized prepolymer obtained in the above-mentioned pulverization step and mixing the crystallizing solvent uniformly with the pulverized prepolymer so as to crystallize it. Moreover, it is preferable to prepare a crystallized prepolymer having a crystal melting point of 180° C. or above and a crystal heat of fusion of 0.5 to 60 J/g when using a DSC (Differential Scanning Calorimeter) with a temperature rise of 10° C./min, by adding 5 to 150 parts by weight of the crystallizing solvent to 100 parts by weight of the pulverized prepolymer and mixing the crystallizing solvent uniformly with the pulverized prepolymer so as to crystallize it.

The conditions under which the prepolymer and the crystallizing solvent are brought into contact are not particularly limited since they depend on the composition and degree of polymerization of the prepolymer, and the type of the crystallizing solvent, but it is preferable that the contact temperature is at most the boiling point of the crystallizing solvent, and more preferably a temperature in a range of 5 to 50° C. lower than the boiling point of the crystallizing solvent, and the contact time is on the order of a few minutes to a few tens of minutes.

In general, the conventionally known crystallization method employs an excess amount of solvent (crystallizing solvent) relative to the weight of the prepolymer. Because of this, considerable expense is needed for removal of the crystallizing solvent. Furthermore, since it is impossible to prevent elution of the prepolymer, considerable expense is needed for recovery of the eluted prepolymer. However, in the method of the present invention since the amount of 5 to 150 parts by weight relative to 100 parts by weight of the pulverized prepolymer is very small compared with the conventional amount of solvent, the cost of removal of the solvent can be greatly reduced, and the amount of eluted prepolymer can successfully be made relatively small.

If the amount of crystallizing solvent that is added to the pulverized prepolymer is less than 5 parts by weight, then it is difficult to uniformly crystallize the entire prepolymer, and the crystal heat of fusion of the crystallized prepolymer thus formed undesirably becomes less than 0.5 J/g. On the other hand, if it is larger than 150 parts by weight, considerable expense is needed for removal of the crystallizing solvent and recovery of the eluted prepolymer, which is undesirable. The amount of crystallizing solvent added is preferably 10 to 130 parts by weight relative to 100 parts by the weight of the pulverized prepolymer, and more preferably 20 to 100 parts by weight.

In the present step, it is preferable to mix the added crystallizing solvent and the pulverized prepolymer uniformly. If the crystallizing solvent and the pulverized prepolymer are not mixed uniformly, then amorphous prepolymer remains after the crystallization step, thus often causing fusion in the solid-phase polymerization step, which is undesirable. The method for mixing the crystallizing solvent and the pulverized prepolymer uniformly is not particularly limited; a conventionally known technique can be used, but it is particularly preferable to employ uniform kneading using an extruder. Even if a part of the amorphous pulverized prepolymer and a part of the crystallized prepolymer are further pulverized so as to make them finer by an external force such as shear when the crystallizing solvent is kneaded uniformly into the pulverized prepolymer, there will be no problem.

The crystallized prepolymer obtained by the above-mentioned method, in which consideration is given to the amount of crystallizing solvent added and the uniform mixing thereof with the prepolymer, has a crystal melting point lower than that of the crystallized prepolymer obtained by the method in which crystallization is carried out without a crystallizing solvent, that is, the heating crystallization step, etc. Because of this, the crystal melting point of the finally obtained polymer becomes low, and it can be remelted at a comparatively low temperature, thereby suppressing thermal degradation, etc. during remelting.

The prepolymer can be crystallized by any of the above-mentioned methods.

(Compression Molding Step)

In the present invention, it is preferable to produce a compression molded crystallized prepolymer by applying pressure to the crystallized prepolymer obtained by the above-mentioned two types of steps, etc. It is also preferable to convert the crystallized prepolymer into particles having a particle size of 5 mm or less that are suitable for the solid-phase polymerization described below or subject the particles having a particle size of 5 mm or less to compression processing to give a compression molded body (aggregate). In this stage, it is preferable for the specific surface area of the compression molded body to be at least 0.001 m$^2$/g. The configuration thereof can be chosen freely from a porous molded body such as a pellet, a powder aggregate, an ordinary powder, etc., and is not particularly limited. If the specific surface area is less than this value, then it becomes harder for by-products such as phenols formed by a condensation reaction to desorb, thereby decreasing the rate of polymerization of the solid-phase polymerization to a great extent. It is therefore preferable for the specific surface area of the crystallized prepolymer to be at least 0.01 $m^2/g$.

In the present invention, it is therefore preferable to subject the crystallized prepolymer to a pulverization treatment prior to it being supplied to the subsequent solid-phase polymerization step in the case where the particle size thereof is larger than 5 mm.

If the particle size is larger than 5 mm, it becomes impossible to apply a sufficient compression pressure in the subsequent compression molding step, and a compression molded body having adequate mechanical strength often cannot be obtained, which is undesirable. On the other hand, if the particle size is less than 0.01 mm, it is easy for air to be included, thus often causing compression faults and insufficient strength, which are undesirable. A more preferable range of the particle size is 0.1 mm to 3 mm, and yet more preferably 0.2 mm to 1 mm.

With regard to a method for making the particle size of the crystallized prepolymer 0.01 mm to 5 mm, it is preferable to add a step of pulverizing the crystallized prepolymer subsequent to the crystallization step 2). Pulverization can employ a conventionally known method.

It should be noted that making the prepolymer obtained in the prepolymerization step 1) have a particle size of 0.01 mm to 5 mm and omitting the step of pulverizing the crystallized prepolymer is also included in the scope of the present invention.

In the present invention, it is preferable to form a compression molded body by applying pressure to the crystallized prepolymer powder. One of the advantages of compressing the crystallized prepolymer powder to give a compression molded body is to avoid problems easily caused by a powder, that is, problems such as blockage, wear, segregation, adhesion/aggregation, solidification, dust scattering, and flushing. Flushing is the flying of a fine powder due to powder flow, etc.

With regard to the problems easily caused by a powder, blockage is easily caused at the time of supply/discharge, storage, and transport; wear is easily caused at the time of transport and pulverization; segregation is easily caused at the time of storage; adhesion/aggregation is easily caused at the time of transport, supply/discharge, dust collection, and pulverization; dust scattering is easily caused at the time of dust collection; and flushing is easily caused at the time of supply/discharge.

In particular, when a powder is involved, in the solid-phase polymerization process, the powder is made to fly by the inert gas, and the residence time of the powder increases, thereby affecting the hue and the composition of the resin and adversely affecting the quality of the resin.

Moreover, when the amount of powder is large, the prepolymer fuses and the prepolymer adheres to a solid-phase polymerization reactor during solid-phase polymerization, which is undesirable. The compression molded body obtained by the present invention can solve the above-mentioned problems.

A method for producing such a compression molded body may be any method and involve any device as long as a molded body can be produced by compression.

With regard to such a device, a compression granulation system and an extrusion granulation system can be cited.

With regard to the extrusion granulation system, a screw system, a roll type cylindrical die system, a roll type disc die system, etc. can be cited as examples. With regard to the compression granulation system, a compression roll system, a briquetting system, a tableting system, etc. can be cited. In terms of productivity, a molded substance made by the compression roll system may be crushed by means of a hammer crusher, etc. to give a molded body (aggregates or granules) having a uniform particle size.

An advantage, other than handling, of a process in which a crystallized prepolymer powder is compressed to give a compression molded body is that the solid-phase polymerization rate increases, thus enhancing the productivity. It has been found that the compression molded body obtained in the present invention can surprisingly enhance the polymerization rate greatly compared with a powder prior to pressure being applied.

It has been found that this is because subjecting the crystallized prepolymer to the compression molding step can give a molded body having an increased specific surface area. It has also been found that the particle size of the crystallized prepolymer, which is subjected to compression molding, is preferably 0.01 mm to 5 mm.

The effect obtained by making the particle size of the crystallized prepolymer, which is subjected to compression molding, 0.01 mm to 5 mm can be obtained by making the particle size of the prepolymer obtained in the prepolymerization step 0.01 to 5 mm while omitting the step in which the prepolymer obtained in the prepolymerization step is pulverized, but an outstanding effect can be obtained by employing the step in which the crystallized prepolymer is pulverized.

It is therefore useful and preferable to subsequently employ a step in which the crystallized prepolymer is pulverized so as to have a particle size of 0.01 mm to 5 mm even when particles having particle sizes of 0.01 mm to 5 mm can be prepared in the prepolymerization step.

When the specific surface area of the molded body having an outstandingly enhanced polymerization rate, which is obtained by the compression molding step of the present invention, is estimated using krypton gas, it is in the range of 0.001 to 1 $m^2/g$, and it has been found that the specific surface area of the molded body is 1.1 to 20 times the specific surface area prior to the compression.

When, by forming a compression molded body, the specific surface area becomes larger than that of the particles prior to compression processing, phenols produced in the solid-phase polymerization step can be discharged quickly outside the reaction system, and as a result the solid-phase polymerization rate increases, which is preferable. When the specific surface area increases by more than 20 times that prior to compression processing, stress fracture of the prepolymer might occur during the compression processing, and undesirable gelling, etc. might often be caused. The increase in specific surface area is more preferably in the range of 1.3 to 15 times, and yet more preferably 1.5 to 10 times.

In the present invention, the bulk density of the molded body obtained in the compression molding step is preferably in the range of 0.5 to 1.5 $g/cm^3$. When the bulk density is less than 0.5 $g/cm^3$, a powder is often easily generated from the molded body, which is undesirable.

On the other hand, when the bulk density is greater than 1.5 $g/cm^3$, the pressure when making the molded body often causes scission of the main chain of the crystallized prepolymer, etc., thereby often causing undesirable side reactions such as cross-linking. It is more preferably in the range of 0.7 to 1.3 $g/cm^3$.

In the present invention, the molded body obtained in the compression molding step can be pulverized a second time to give finer aggregates or granules. The compression molded body related to the present invention is a concept that includes such re-pulverized forms.

The temperature of the crystallized prepolymer in the compression molding step is preferably from room temperature to a temperature that is at most the melting point of the prepolymer obtained in the prepolymerization step 1) and, in particular, in the range of (the glass transition temperature of the prepolymer obtained in the prepolymerization step 1) −70° C.) to (the glass transition temperature of the prepolymer obtained in the prepolymerization step 1) +70° C.).

Furthermore, in this case, the strength of the molded body after the compression molding step can be enhanced by increasing, at least temporarily, the temperature of the crystallized prepolymer during the compression molding step, or the temperature of the compression molded body obtained in the compression molding step, to at least the glass transition temperature of the prepolymer obtained in the prepolymerization step 1). A sufficient period of time for it to be maintained at the glass transition temperature or above is often 5 minutes or less.

(Solid-Phase Polymerization Step)

In the present invention, the above-mentioned crystallized prepolymer or the compression molded body of the crystallized prepolymer is then subjected to solid-phase polymerization. It is preferably carried out by heating at a temperature that is at least the glass transition temperature of the crystallized prepolymer and that can maintain the crystallized prepolymer or the molded body in a solid-phase state.

'Heating at a temperature that can maintain the crystallized prepolymer or the molded body in a solid-phase state' referred to in the present invention means that the crystallized prepolymer or the molded body subjected to the reaction, or the crystallized prepolymer or the molded body during the reaction, does not fuse and attain a state in which it cannot be crushed.

The temperature that can maintain the compression molded body in a solid-phase state and that is employed in the solid-phase polymerization step 3) depends on the composition and the degree of polymerization of the polymer, but it is at least the glass transition temperature of the crystallized prepolymer and at most 260° C. If the solid-phase polymerization temperature is lower than the glass transition temperature of the crystallized prepolymer, the polymerization takes an undesirably long time. On the other hand, if it is higher than 260° C., the crystal growth rate becomes extremely high, which is undesirable. This is because the upper limit of the heat absorption temperature range associated with crystal melting of the wholly aromatic polyester polycarbonate when the solid-phase polymerization is completed exceeds 360° C. When remelting the crystallized wholly aromatic polyester carbonate to make it amorphous it is necessary to heat it at a temperature higher than 360° C., and as a result coloration often tends to occur, which is undesirable.

A preferable range for the solid-phase polymerization temperature is from at least 180° C. to at most 255° C., and more preferably at least 185° C. to at most 250° C. Since the glass transition temperature and the upper limit temperature that can maintain a solid-phase state increase as the polymerization progresses, the heating temperature can be increased stepwise or gradually.

The solid-phase polymerization step 3) of the present invention is also preferably carried out at atmospheric pressure or under reduced pressure. At atmospheric pressure, it is preferable to use an atmosphere of an inert gas such as nitrogen, argon, or carbon dioxide.

The crystallized wholly aromatic polyester carbonate obtained in the solid-phase polymerization step 3) of the present invention can be remelted and handled as an amorphous wholly aromatic polyester carbonate.

In this solid-phase polymerization step 3), the reduced viscosity (measured under the same conditions as above) of the crystallized wholly aromatic polyester carbonate when the solid-phase polymerization is completed is preferably at least 0.55 dL/g. This is because, if the reduced viscosity of the amorphous wholly aromatic polyester carbonate obtained by remelting is less than 0.55 dL/g, then the heat resistance and the toughness of the polymer obtained are inadequate, which is undesirable. In practice, the upper limit of the reduced viscosity is preferably on the order of 2.0.

Furthermore, in this solid-phase polymerization step 3), the upper limit of the heat absorption temperature range associated with crystal melting of the wholly aromatic polyester carbonate when the solid-phase polymerization is completed is preferably at most 360° C. when using a DSC (Differential Scanning Calorimeter) with a temperature rise of 10° C./min. If the upper limit of the heat absorption temperature range is higher than 360° C., thermal degradation is caused when remelting (melting) the polymer. The upper limit of the heat absorption temperature range is preferably 350° C. or less, and more preferably 340° C. or less.

Moreover, it is preferable in this solid-phase polymerization that the reduced viscosity (measured under the same conditions as above) of the crystallized polyester carbonate when the solid-phase polymerization is completed is preferably at least 0.55 dL/g, and that the upper limit of the heat absorption temperature range associated with crystal melting is at most 360° C. when using a DSC (Differential Scanning Calorimeter) with a temperature rise of 10° C./min.

The wholly aromatic polyester carbonate produced by such a production process has repeating units represented by formula (V) below.

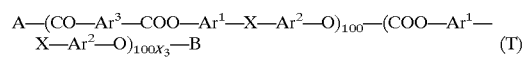

$$A-(CO-Ar^3-COO-Ar^1-X-Ar^2-O)_{100}-(COO-Ar^1-X-Ar^2-O)_{100X_3}-B \quad (T)$$

{In formula (V), $Ar^1$ and $Ar^2$ are each phenylene groups, which may be substituted, $Ar^3$ is an aromatic group, which may be substituted, X is a divalent organic group represented by formula (II) below

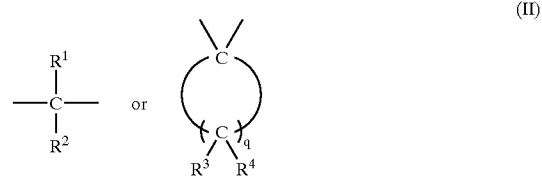

(here, $R^1$, $R^2$, $R^3$, and $R^4$ are each independently chosen from the group consisting of a hydrogen atom, a halogen atom, an alkyl group having 1 to 6 carbons, a cycloalkyl group having 5 or 6 carbons, an aryl group having 6 to 12 carbons, and an aralkyl group having 7 to 12 carbons, q denotes an integer of 4 to 10, and q each of $R^3$ and $R^4$ may be identical or different), and $X_3$ is a number greater than 0 and at most 0.5.}

The repeating units comprise a wholly aromatic polyester component and a wholly aromatic polycarbonate component; these repeating units are random copolymerized, and by carrying out the above-mentioned production process using the above-mentioned starting materials the molecular terminal groups A and B become groups chosen from the group consisting of an aryloxy group which may be substituted with a halogen atom or a methyl group, a hydroxyaryl group which may have a substituent, and a carboxyaryl group which may have a substituent. Preferable structures of the repeating units are repeating units corresponding to the compounds of preferable aromatic diol components (a) and aromatic dicarboxylic acid components (b) explained in the section relating to the starting monomers, etc. of the production process, and the molecular termini also have terminal structures derived from the compounds corresponding to preferable aromatic diol components (a), aromatic dicarboxylic acid components (b), and diaryl carbonates (c).

A more preferable mode is one determined by the aromatic diol component (a) and the aromatic dicarboxylic acid component (b) used as the starting materials as described above, and is a wholly aromatic polyester carbonate in which $Ar^3$ is a p-phenylene group alone or a component mixture of a p-phenylene group and m-phenylene group, which satisfies the expression ($\alpha$) below.

$$0 \leq ia/ta < 1 \qquad (\alpha)$$

(In the expression, ia and ta denote the mole fractions of the m-phenylene group and the p-phenylene group respectively relative to all of the $Ar^3$.)

A yet more preferable mode is a wholly aromatic polyester carbonate in which $Ar^3$ is a component mixture of a m-phenylene group and p-phenylene group, which satisfies the expression ($\beta$) below.

$$0.25 \leq ia/ta \leq 0.67 \qquad (\beta)$$

(In the expression, ia and ta denote the mole fractions of the m-phenylene group and the p-phenylene group respectively relative to all of the $Ar^3$.)

The molecular terminal groups are determined by the three types of starting materials used; specific examples of the aryloxy group, which may be substituted, include phenoxy, naphthyloxy, methylphenoxy, chlorophenoxy, and dichlorophenoxy; specific examples of the hydroxyaryl group include hydroxyphenyl, 3-methyl-4-hydroxyphenyl, 3,5-dichloro-4-hydroxyphenoxy, and 3,5-dimethyl-4-hydroxyphenoxy; and specific examples of the carboxyaryl group include carboxyphenyl and carboxynaphthyl. The molar ratio of these molecular terminal groups can be chosen, according to the intended purpose, from a wide range by means of the molar ratio of the starting monomers represented by the above-mentioned formulae (1) to (3) and the reaction conditions. However, in order to prevent coloration and hydrolysis of the wholly aromatic polyester carbonate obtained, it is preferable to select the starting monomers and the reaction conditions so that the molar ratio of the aryloxy group is high.

In the production of the wholly aromatic polyester carbonate of the present invention, since a pyridine compound or a titanium compound described in the above-mentioned formulae (III) and (IV) is used, it is also a preferable mode for reducing the content of alkaline metals often used as alternative ester exchange catalysts. In particular, the sodium content can be reduced compared with the conventional wholly aromatic polyester carbonate; the sodium content is preferably 0.1 to 10 ppm or less, particularly preferably 0.1 to 8 ppm or less, and most preferably 0.1 to 5 ppm or less.

It is also possible in the present invention to add various types of additive such as a stabilizer, a colorant, a pigment, and a lubricant as necessary to above-mentioned wholly aromatic polyester carbonate during the production or immediately after the production.

In accordance with the process for the production of a wholly aromatic polyester carbonate of the present invention, a wholly aromatic polyester carbonate that has low coloration and high transparency, and has a high degree of polymerization while maintaining good heat resistance and mechanical properties can be obtained quickly by an inexpensive process using an aromatic dicarboxylic acid and an aromatic diol directly as the starting materials without esterifying the aromatic dicarboxylic acid component and the aromatic diol component in advance. Furthermore, there are the advantages that the prepolymer that is subjected to solid-phase polymerization can be crystallized easily, problems due to powder and handling in the process can be improved, the solid-phase polymerization time can be shortened by an increase in the polymerization rate, the polymer obtained by solid-phase polymerization can be melted at a comparatively low temperature to make it amorphous, etc.

The wholly aromatic polyester carbonate having a specific terminal group of the present invention has excellent heat resistance and mechanical properties, has low coloration and high transparency, and can melt at a comparatively low temperature to become amorphous.

The wholly aromatic polyester carbonate of the present invention can be used suitably for a molded material such as an automotive light cover or an electronic component having excellent heat resistance, transparency, etc. by remelting it and then making it into a substantially amorphous resin.

EXAMPLES

The present invention is explained in detail below by reference to examples and comparative examples, but the present invention is in no way limited thereby. 'Parts' in the examples denotes 'parts by weight'.

As described above, the reduced viscosity was measured in a phenol/1,1,2,2-tetrachloroethane solvent mixture (ratio by weight 60/40) at a concentration of 1.2 g/100 mL and a temperature of 35° C.

Polymer thermal properties were measured using a DSC (DSC 2920: manufactured by TA Instruments) at a rate of temperature increase of 10° C./min. The crystal melting point when using the DSC (Differential Scanning Calorimeter) with a temperature rise of 10° C./min can be obtained from a minimum point of a DSC curve as shown in FIG. 1. Furthermore, the heat absorption temperature range associated with crystal melting when using the DSC (Differential Scanning Calorimeter) with a temperature rise of 10° C./min can be obtained from the DSC curve as shown in FIG. 1 as the temperature range from a point (X in FIG. 1) where the curve deviates from a gently declining straight line due to the crystals starting to melt to a point (Y in FIG. 1) where the curve reverts to the above gently declining line when crystal melting is completed. Y is the upper limit thereof. Moreover, the crystal heat of fusion can be measured as the peak area between X and Y in the figure (absolute value of the product of time and heat flux from X to Y.)

The specific surface area of crystallized prepolymer was evaluated by means of the amount of krypton adsorbed at the boiling point of liquid nitrogen using a BELSORP 36 manufactured by Bel Japan, Inc.

Furthermore, the repeating units and the molecular terminal groups of the wholly aromatic polyester carbonate obtained were subjected to NMR analysis by a standard method using a JNM-A400 manufactured by JEOL Ltd.

Example 1

A reactor equipped with a stirrer and a vacuum distillation system provided with a nitrogen inlet was charged with 46.5 parts of terephthalic acid, 19.9 parts of isophthalic acid, 100.4 parts of 2,2-bis(4-hydroxyphenyl)propane, 179.9 parts of diphenyl carbonate, and 0.084 parts of tetraphenoxytitanium, and a reaction started at 200° C.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.428$

After 30 minutes had passed, the temperature was increased to 220° C., and after confirming that phenol was distilling at this temperature, the pressure of the system was gradually decreased.

4 hours after starting the reaction, it was confirmed that the starting materials were uniformly dissolved. The temperature was then further increased and the pressure was decreased, and 6 hours after starting the reaction the system was at 290° C. and 133.4 Pa (about 10 mmHg).

Polymerization was carried out under the same conditions for 20 minutes to give a slightly yellow-colored transparent prepolymer. The reduced viscosity of the prepolymer obtained by this prepolymerization was 0.22 dL/g.

The above-mentioned prepolymer was heated under an atmosphere of nitrogen from room temperature to 240° C. and maintained at the same temperature for 4 hours to give a white opaque crystallized prepolymer.

The reduced viscosity of the crystallized prepolymer thus obtained was 0.25 dL/g, the heat absorption temperature range associated with crystal melting was from at least 280° C. to at most 315° C. when using a DSC (Differential Scanning Calorimeter) with a temperature rise of 10° C./min, and the crystal heat of fusion was 7.8 J/g. Furthermore, the glass transition temperature was 132° C.

The crystallized prepolymer was pulverized into particles having a particle size of 1.2 mm, with particles having a particle size of 0.5 mm excluded, then placed in a reactor having a vacuum distillation system, and heated under 66.7 Pa (0.5 mmHg) at 250° C. for 18 hours, and at 270° C. for 17 hours. During this, the crystallized prepolymer remained in a solid-phase state.

The upper limit of the heat absorption temperature range associated with crystal melting of the crystalline wholly aromatic polyester carbonate thus obtained was 335° C., and the reduced viscosity was 0.94 dL/g. Keeping this crystalline wholly aromatic polyester carbonate at 340° C. for 3 minutes gave an amorphous wholly aromatic polyester carbonate having a reduced viscosity of 0.88 dL/g and a glass transition temperature of 193° C.

When the amorphous wholly aromatic polyester carbonate thus obtained was further analyzed using NMR, a wholly aromatic polyester component having an isophthalic acid- or terephthalic acid-2,2-bis(4-hydroxyphenyl)propane repeating unit and a wholly aromatic polycarbonate component derived from 2,2-bis(4-hydroxyphenyl)propane were observed, and the proportion of the second component was 10 mol relative to 100 mol of the first component. This demonstrates that the composition of the wholly aromatic polyester carbonate obtained was as expected from the composition initially charged, and it/ta was 0.43. With regard to the molecular terminal groups, the phenyl ester terminal group derived from the phenyl esters of diphenyl carbonate and the aromatic dicarboxylic acids, and the hydroxyphenyl terminal group derived from 2,2-bis(4-hydroxyphenyl)propane were observed at a ratio of 50/50, and the amount of phenyl carboxylic acid terminal group derived from the aromatic dicarboxylic acids was below the detection limit.

Comparative Example 1

A prepolymerization reaction was carried out under the same conditions as those of Example 1 except that 33.2 parts of terephthalic acid and 33.2 parts of isophthalic acid were used instead of 46.5 parts of terephthalic acid and 19.9 parts of isophthalic acid. The prepolymer thus obtained was transparent with a trace of yellow, and its reduced viscosity was 0.24 dL/g. A crystal melting point could not be measured by DSC.

The numerical values for the above-mentioned expressions (2) and (4), and the values of $X_1$ and $X_2$ were as follows.

$C/(A+B)=1.0$ $X_1=0.1$ $X_2=0.1$ $IA/TA=1$

The above prepolymer was gradually cooled from a molten state to 230° C. and maintained at this temperature for 6 hours, the prepolymer thus obtained was pale yellowish and transparent, the reduced viscosity was 0.26 dL/g, and a crystal melting point could not be observed by DSC. The glass transition temperature was 132° C.

The prepolymer was pulverized into particles having a particle size of 1.2 mm, with particles having a particle size of 0.5 mm excluded, and then placed in a reactor having a vacuum distillation system; solid-phase polymerization was carried out under 66.7 Pa (0.5 mmHg) at 220° C., but fusion was observed in a few minutes, and no increase in the reduced viscosity was observed.

Comparative Example 2

A prepolymerization reaction was carried out under the same conditions as those of Example 1 except that 33.2 parts of terephthalic acid and 33.2 parts of isophthalic acid were used instead of 46.5 parts of terephthalic acid and 19.9 parts of isophthalic acid. The prepolymer thus obtained was transparent with a trace of yellow, and its reduced viscosity was 0.24 dL/g.

The numerical values for the above-mentioned expressions (2) and (4), and the values of $X_1$ and $X_2$ were as follows.

$C/(A+B)=1.0$ $X_1=0.1$ $X_2=0.1$ $IA/TA=1$

The above prepolymer was heated under an atmosphere of nitrogen from room temperature to 240° C. and maintained at this temperature for 6 hours, the prepolymer thus obtained was pale yellowish and transparent, the reduced viscosity was 0.20 dL/g, and the glass transition temperature was 138° C. A crystal melting point could not be observed by DSC.

The prepolymer was pulverized into particles having a particle size of 1.2 mm, with particles having a particle size of 0.5 mm excluded, and then placed in a reactor having a vacuum distillation system; solid-phase polymerization was carried out under 66.7 Pa (0.5 mmHg) at 220° C., but fusion was observed in a few minutes, and no increase in the reduced viscosity was observed.

Example 2

A reactor equipped with a stirrer and a vacuum distillation system provided with a nitrogen inlet was charged with 46.5 parts of terephthalic acid, 19.9 parts of isophthalic acid, 100.4 parts of 2,2-bis(4-hydroxyphenyl)propane, 179.9 parts of diphenyl carbonate, 0.049 parts of dimethylaminopyridine, and 0.016 parts of potassium carbonate, and a reaction started at 200° C.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.428$

After 30 minutes had passed, the temperature was increased to 220° C., and after confirming that phenol was distilling at this temperature, the pressure of the system was gradually decreased.

4 hours after starting the reaction, it was confirmed that the starting materials were uniformly dissolved. The temperature was then further increased and the pressure was decreased, and 6 hours after starting the reaction the system was at 300° C. and 133.4 Pa (about 10 mmHg).

Polymerization was carried out under the same conditions for 20 minutes to give a slightly yellow-colored transparent prepolymer. The reduced viscosity of the prepolymer obtained by this prepolymerization was 0.20 dL/g.

30 g of the above-mentioned prepolymer was pulverized into a particle size of 2 mm or below, 12 g of acetone was then added thereto, and kneading at 25° C. for 10 minutes gave a white opaque crystallized prepolymer.

The reduced viscosity of the crystallized prepolymer thus obtained was 0.20 dL/g, the heat absorption temperature range associated with crystal melting was from at least 202° C. to at most 275° C. when using a DSC (Differential Scanning Calorimeter) with a temperature rise of 10° C./min, and the crystal heat of fusion was 12.5 J/g. Furthermore, the glass transition temperature was 128° C.

The crystallized prepolymer was pulverized into particles having a particle size of 1.2 mm, with particles having a particle size of 0.5 mm excluded, then placed in a reactor having a vacuum distillation system, and heated under 66.7 Pa (0.5 mmHg) at 180° C. for 2 hours, at 200° C. for 10 hours, and at 220° C. for 10 hours. During this, the crystallized prepolymer remained in a solid-phase state.

The upper limit of the heat absorption temperature range associated with crystal melting of the crystalline wholly aromatic polyester carbonate thus obtained was 322° C., and the reduced viscosity was 0.88 dL/g. Keeping this crystalline wholly aromatic polyester carbonate at 340° C. for 3 minutes gave an amorphous wholly aromatic polyester carbonate having a reduced viscosity of 0.80 dL/g and a glass transition temperature of 193° C.

As hereinbefore described, a wholly aromatic polyester carbonate having a high degree of polymerization could be obtained quickly.

Example 3

A prepolymerization reaction was carried out under the same conditions as those of Example 2 except that 43.2 parts of terephthalic acid, 23.2 parts of isophthalic acid, 103.1 parts of 2,2-bis(4-hydroxyphenyl)propane, and 182.5 parts of diphenyl carbonate were used instead of 46.5 parts of terephthalic acid, 19.9 parts of isophthalic acid, 100.4 parts of 2,2-bis(4-hydroxyphenyl)propane, and 179.9 parts of diphenyl carbonate. The prepolymer thus obtained was transparent with a trace of yellow, and its reduced viscosity was 0.27 dL/g.

The numerical values for the above-mentioned expressions (2) and (4), and the values of $X_1$ and $X_2$ were as follows.

$C/(A+B)=1.0$ $X_1=0.13$ $X_2=0.13$ $IA/TA=0.538$ 30 g of the above-mentioned prepolymer was pulverized into a particle size of 2 mm or below, 18 g of acetone was then added thereto, and kneading at 25° C. for 10 minutes gave a white opaque crystallized prepolymer.

The reduced viscosity of the crystallized prepolymer thus-obtained was 0.27 dL/g, the heat absorption temperature range associated with crystal melting was from at least 207° C. to at most 282° C. when using a DSC (Differential Scanning Calorimeter) with a temperature rise of 10° C./min, and the crystal heat of fusion was 4.5 J/g. Furthermore, the glass transition temperature was 141° C.

The crystallized prepolymer was pulverized into particles having a particle size of 1.2 mm, with particles having a particle size of 0.5 mm excluded, then placed in a reactor having a vacuum distillation system, and heated under 66.7 Pa (0.5 mmHg) at 180° C. for 2-hours, at 200° C. for 10 hours, and at 220° C. for 10 hours. During this, the crystallized prepolymer remained in a solid-phase state.

The upper limit of the heat absorption temperature range associated with crystal melting of the crystalline wholly aromatic polyester carbonate thus obtained was 323° C., and the reduced viscosity was 0.83 dL/g. Keeping this crystalline wholly aromatic polyester carbonate at 340° C. for 3 minutes gave an amorphous wholly aromatic polyester carbonate having a reduced viscosity of 0.75 dL/g and a glass transition temperature of 190° C.

When the amorphous wholly aromatic polyester carbonate thus obtained was further analyzed using NMR, a wholly aromatic polyester component having an isophthalic acid- or terephthalic acid-2,2-bis(4-hydroxyphenyl)propane repeating unit and a wholly aromatic polycarbonate component derived from 2,2-bis(4-hydroxyphenyl)propane were observed, and the proportion of the second component was 13 mol relative to 100 mol of the first component. This demonstrates that the composition of the wholly aromatic polyester carbonate obtained was as expected from the composition initially charged, and it/ta was 0.54. With regard to the molecular terminal groups, the phenyl ester terminal group derived from the phenyl esters of diphenyl carbonate and the aromatic dicarboxylic acids, and the hydroxyphenyl terminal group derived from 2,2-bis(4- hydroxyphenyl)propane were observed at a ratio of 52/48, and the amount of phenyl carboxylic acid terminal group derived from the aromatic dicarboxylic acids was below the detection limit.

As hereinbefore described, a wholly aromatic polyester carbonate having a high degree of polymerization could be obtained quickly.

Example 4

A reactor equipped with a stirrer and a vacuum distillation system provided with a nitrogen inlet was charged with 46.5 parts of terephthalic acid, 19.9 parts of isophthalic acid, 100.4 parts of 2,2-bis(4-hydroxyphenyl)propane, 179.9 parts of diphenyl carbonate, 0.049 parts of 4-dimethylaminopyridine, and 0.016 parts of potassium carbonate, and a reaction started at 200° C.

The numerical values for the above-mentioned expressions (2) and (4), and the values of X, and $X_2$ were as follows.

$C/(A+B)=1.0$ $X_1=0.1$ $X_2=0.1$ $IA/TA=0.429$

After 30 minutes had passed, the temperature was increased to 220° C., and after confirming that phenol was distilling at this temperature, the pressure of the system was gradually decreased.

4 hours after starting the reaction, it was confirmed that the starting materials were uniformly dissolved. The temperature was then further increased and the pressure was decreased, and 6 hours after starting the reaction the system was at 300° C. and 133.4 Pa (about 10 mmHg).

Polymerization was carried out under the same conditions for 10 minutes to give a slightly yellow-colored transparent prepolymer. The reduced viscosity of the prepolymer obtained by this prepolymerization was 0.13 dL/g.

The above-mentioned prepolymer was cooled from 300° C. to 200° C. over approximately 3 minutes, 1 part by weight of a crystalline wholly aromatic polyester carbonate powder having a melting point of 260° C. was then added to 100 parts by weight of the molten prepolymer, and it was maintained at the same temperature for 1 hour to give a crystallized prepolymer. Stirring was continued at 24 rpm after the addition, where possible.

The crystallized prepolymer thus obtained had a heat absorption temperature range associated with crystal melting of at least 220° C. to at most 283° C. when using a DSC (Differential Scanning Calorimeter) with a temperature rise of 10° C./min, and a crystal heat of fusion of 10.3 J/g. Furthermore, the glass transition temperature was 115° C.

The crystallized prepolymer was taken in lump form and pulverized into particles having a particle size of 0.5 mm, with particles having a particle size of 0.1 mm excluded, then placed in a reactor having a vacuum distillation system, and heated under 66.7 Pa (0.5 mmHg) at 200° C. for 3 hours, and at 220° C. for 6 hours to give a crystalline wholly aromatic polyester carbonate having a reduced viscosity of 0.85 dL/g and an upper limit of the heat absorption temperature range associated with crystal melting of 330° C. Keeping this crystalline wholly aromatic polyester carbonate at 340° C. for 3 minutes gave an amorphous wholly aromatic polyester carbonate having a reduced viscosity of 0.78 dL/g and a glass transition temperature of 193° C.

As hereinbefore described, a wholly aromatic polyester carbonate having a high degree of polymerization could be obtained quickly.

Example 5

A prepolymerization reaction was carried out under the same conditions as those of Example 4 except that 43.2 parts of terephthalic acid and 23.3 parts of isophthalic acid were used instead of 46.5 parts of terephthalic acid and 19.9 parts of isophthalic acid. The prepolymer thus obtained was transparent with a trace of yellow, and its reduced viscosity was 0.15 dL/g.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.538$

The above-mentioned prepolymer was cooled from 300° C. to 200° C. over approximately 3 minutes, 1 part by weight of a crystalline wholly aromatic polyester carbonate powder was then added to 100 parts by weight of the molten prepolymer, and it was maintained at the same temperature for 1 hour to give a crystallized prepolymer. Stirring was continued at 24 rpm after the addition, where possible.

The crystallized prepolymer thus obtained had a heat absorption temperature range associated with crystal melting of at least 210° C. to at most 280° C. when using a DSC (Differential Scanning Calorimeter) with a temperature rise of 10° C./min, and a crystal heat of fusion of 5.2 J/g. Furthermore, the glass transition temperature was 119° C.

The crystallized prepolymer was taken in lump form and pulverized into particles having a particle size of 0.5 mm, with particles having a particle size of 0.1 mm excluded, then placed in a reactor having a vacuum distillation system, and heated under 66.7 Pa (0.5 mmHg) at 200° C. for 3 hours, and at 220° C. for 6 hours to give a crystalline wholly aromatic polyester carbonate having a reduced viscosity of 0.89 dL/g and an upper limit of the heat absorption temperature range associated with crystal melting of 325° C. Keeping this crystalline wholly aromatic polyester carbonate at 340° C. for 3 minutes gave an amorphous wholly aromatic polyester carbonate having a reduced viscosity of 0.80 dL/g and a glass transition temperature of 193° C.

As hereinbefore described, a wholly aromatic polyester carbonate having a high degree of polymerization could be obtained quickly.

Example 6

A reactor equipped with a stirrer and a vacuum distillation system provided with a nitrogen inlet was charged with 43.2 parts of terephthalic acid, 23.3 parts of isophthalic acid, 100.4 parts of 2,2-bis(4-hydroxyphenyl)propane, 179.9 parts of diphenyl carbonate, 0.049 parts of 4-dimethylaminopyridine and 0.016 parts of potassium carbonate, and a reaction started at 200° C.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.538$

After 30 minutes had passed, the temperature was increased to 220° C., and after confirming that phenol was distilling at this temperature, the pressure of the system was gradually decreased.

4 hours after starting the reaction, it was confirmed that the starting materials were uniformly dissolved. The temperature was then further increased and the pressure was decreased, and 6 hours after starting the reaction the system was at 300° C. and 133.4 Pa (about 10 mmHg).

Polymerization was carried out under the same conditions for 30 minutes to give a slightly yellow-colored transparent prepolymer. The reduced viscosity of the prepolymer obtained by this prepolymerization was 0.25 dL/g.

The above-mentioned prepolymer was cooled from 300° C. to 200° C. over approximately 3 minutes, 1 part by weight of a crystalline wholly aromatic polyester carbonate powder was then added to 100 parts by weight of the molten prepolymer, and it was maintained at the same temperature for 1 hour to give a crystallized prepolymer. Stirring was continued at 24 rpm after the addition, where possible.

The crystallized prepolymer thus obtained had a heat absorption temperature range associated with crystal melting of at least 210° C. to at most 290° C. when using a DSC (Differential Scanning Calorimeter) with a temperature rise of 10° C./min, and a crystal heat of fusion of 4.3 J/g. Furthermore, the glass transition temperature was 140° C.

The crystallized prepolymer was taken in lump form and pulverized into particles having a particle size of 0.5 mm, with particles having a particle size of 0.1 mm excluded, then placed in a reactor having a vacuum distillation system, and heated under 66.7 Pa (0.5 mmHg) at 200° C. for 3 hours, and at 220° C. for 6 hours to give a crystalline wholly aromatic polyester carbonate having a reduced viscosity of 0.87 dL/g and an upper limit of the heat absorption temperature range associated with crystal melting of 328° C. Keeping this crystalline wholly aromatic polyester carbonate at 340° C. for 3 minutes gave an amorphous wholly aromatic polyester carbonate having a reduced viscosity of 0.79 dL/g and a glass transition temperature of 193° C.

As hereinbefore described, a wholly aromatic polyester carbonate having a high degree of polymerization could be obtained quickly.

Example 7

A reactor equipped with a stirrer and a vacuum distillation system provided with a nitrogen inlet was charged with 46.5 parts of terephthalic acid, 19.9 parts of isophthalic acid, 100.4 parts of 2,2-bis(4-hydroxyphenyl)propane, 179.9 parts of diphenyl carbonate, 0.049 parts of 4-dimethylaminopyridine and 0.016 parts of potassium carbonate, and a reaction started at 200° C.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.429$

After 30 minutes had passed, the temperature was increased to 220° C., and after confirming that phenol was distilling at this temperature, the pressure of the system was gradually decreased.

4 hours after starting the reaction, it was confirmed that the starting materials were uniformly dissolved. The temperature was then further increased and the pressure was decreased, and 6 hours after starting the reaction the system was at 300° C. and 133.4 Pa (about 10 mmHg).

Polymerization was carried out under the same conditions for 10 minutes to give a slightly yellow-colored transparent prepolymer. The reduced viscosity of the prepolymer obtained by this prepolymerization was 0.17 dL/g.

The above-mentioned prepolymer was placed in a single shaft extruder (RY45-30 JM7.5 1/15) manufactured by Rikua K. K., and shear was applied to the prepolymer at 48 rpm and 210° C. for approximately 2 minutes to give a cloudy crystallized prepolymer.

The crystallized prepolymer thus obtained had a heat absorption temperature range associated with crystal melting of at least 220° C. to at most 292° C. when using a DSC (Differential Scanning Calorimeter) with a temperature rise of 10° C./min, and a crystal heat of fusion of 12.8 J/g. Furthermore, the glass transition temperature was 121° C.

The above-mentioned crystallized prepolymer was pulverized into particles having a particle size of 0.84 mm, with particles having a particle size of 0.5 mm excluded. The particles were placed in a reactor having a vacuum distillation system, and heated under 66.7 Pa (0.5 mmHg) at 200° C. for 3 hours and at 220° C. for 7 hours so as to carry out solid-phase polymerization to give a crystalline wholly aromatic polyester carbonate having a reduced viscosity of 0.85 dL/g and an upper limit of the heat absorption temperature range associated with crystal melting of 325° C. Keeping this crystalline wholly aromatic polyester carbonate at 340° C. for 3 minutes gave an amorphous wholly aromatic polyester carbonate having a reduced viscosity of 0.78 dL/g and a glass transition temperature of 193° C.

As hereinbefore described, a wholly aromatic polyester carbonate having a high degree of polymerization could be obtained quickly.

Example 8

The prepolymer obtained in the prepolymerization of Example 7 was placed in a reactor equipped with a stirrer and a vacuum distillation system provided with a nitrogen inlet, made molten at 300° C., and then rapidly cooled to 210° C., and shear was applied to the prepolymer at a rotational speed of 24 rpm by means of the stirrer. 10 minutes after starting the application of shear, the prepolymer became cloudy and a crystallized prepolymer was obtained.

The crystallized prepolymer thus obtained had a heat absorption temperature range associated with crystal melting of at least 220° C. to at most 290° C. when using a DSC (Differential Scanning Calorimeter) with a temperature rise of 10° C./min, and a crystal heat of fusion of 9.7 J/g. Furthermore, the glass transition temperature was 121° C.

The above-mentioned crystallized prepolymer was pulverized into particles having a particle size of 0.84 mm, with particles having a particle size of 0.5 mm excluded. The particles were placed in a reactor having a vacuum distillation system, and heated under 66.7 Pa (0.5 mmHg) at 200° C. for 3 hours and at 220° C. for 7 hours so as to carry out solid-phase polymerization to give a crystalline wholly aromatic polyester carbonate having a reduced viscosity of 0.87 dL/g and an upper limit of the heat absorption temperature range associated with crystal melting of 330° C. Keeping this crystalline wholly aromatic polyester carbonate at 340° C. for 3 minutes gave an amorphous wholly aromatic polyester carbonate having a reduced viscosity of 0.79 dL/g and a glass transition temperature of 193° C.

As hereinbefore described, a wholly aromatic polyester carbonate having a high degree of polymerization could be obtained quickly.

Example 9

A prepolymerization reaction was carried out under the same conditions as those of Example 7 except that 43.2 parts of terephthalic acid and 23.2 parts of isophthalic acid were used instead of 46.5 parts of terephthalic acid and 19.9 parts of isophthalic acid. The prepolymer thus obtained was transparent with a trace of yellow, and its reduced viscosity was 0.21 dL/g.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.54$

The above-mentioned prepolymer was placed in a reactor equipped with a stirrer and a vacuum distillation system provided with a nitrogen inlet and heated from room temperature to 300° C. to make it molten. The molten prepolymer was then rapidly cooled to 200° C., and shear was applied to the prepolymer at a rotational speed of 24 rpm by means of the stirrer. 30 minutes after starting the application of shear, the prepolymer became cloudy and a crystallized prepolymer was obtained.

The crystallized prepolymer thus obtained had a heat absorption temperature range associated with crystal melting of at least 230° C. to at most 280° C. when using a DSC (Differential Scanning Calorimeter) with a temperature rise of 10° C./min, and a crystal heat of fusion of 10.5 J/g. Furthermore, the glass transition temperature was 123° C.

The above-mentioned crystallized prepolymer was pulverized into particles having a particle size of 0.84 mm, with particles having a particle size of 0.5 mm excluded. The particles were placed in a reactor having a vacuum distillation system, and heated under 66.7 Pa (0.5 mmHg) at 200° C. for 3 hours and at 220° C. for 7 hours so as to carry out solid-phase polymerization to give a crystalline wholly aromatic polyester carbonate having a reduced viscosity of 0.81 dL/g and an upper limit of the heat absorption temperature range associated with crystal melting of 320° C. Keeping this crystalline wholly aromatic polyester carbonate at 340° C. for 3 minutes gave an amorphous wholly aromatic polyester carbonate having a reduced viscosity of 0.76 dL/g and a glass transition temperature of 193° C.

As hereinbefore described, a wholly aromatic polyester carbonate having a high degree of polymerization could be obtained quickly.

Comparative Example 3

A prepolymerization reaction was carried out under the same conditions as those of Example 7 except that 33.2 parts of terephthalic acid, 33.2 parts of isophthalic acid, 109.6 parts of 2,2-bis(4-hydroxyphenyl)propane, and 188.5 parts of diphenyl carbonate were used instead of 46.5 parts of terephthalic acid, 19.9 parts of isophthalic acid, 100.4 parts of 2,2-bis(4-hydroxyphenyl)propane, and 179.9 parts of diphenyl carbonate. The prepolymer thus obtained was transparent with a trace of yellow, and its reduced viscosity was 0.19 dL/g.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.1$

The above-mentioned prepolymer was placed in a reactor equipped with a stirrer and a vacuum distillation system provided with a nitrogen inlet, and heated from room temperature to 300° C. so as to make the prepolymer molten. The molten prepolymer was then rapidly cooled to 210° C., and shear was applied to the prepolymer at a rotational speed of 24 rpm by means of the stirrer for 60 minutes, but cloudiness of the prepolymer was not observed and no heat absorption peak accompanying crystal melting was observed when using a DSC (Differential Scanning Calorimeter) with a temperature rise of 10° C./min. The glass transition temperature was 128° C.

Example 10

A reactor equipped with a stirrer and a vacuum distillation system provided with a nitrogen inlet was charged with 46.5 parts of terephthalic acid, 19.9 parts of isophthalic acid, 100.4 parts of 2,2-bis(4-hydroxyphenyl)propane, 179.9 parts of diphenyl carbonate, 0.049 parts of 4-dimethylaminopyridine and 0.016 parts of potassium carbonate, and a reaction started at 200° C.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.429$

After 30 minutes had passed, the temperature was increased to 220° C., and after confirming that phenol was distilling at this temperature, the pressure of the system was gradually decreased.

4 hours after starting the reaction, it was confirmed that the starting materials were uniformly dissolved. The temperature was then further increased and the pressure was decreased, and 6 hours after starting the reaction the system was at 300° C. and 133.4 Pa (about 10 mmHg).

Polymerization was carried out under the same conditions for 10 minutes to give a slightly yellow-colored transparent prepolymer. The reduced viscosity of the prepolymer obtained by this prepolymerization was 0.17 dL/g.

The above-mentioned prepolymer was placed in a single shaft extruder (RY45-30 JM7.5 1/15) manufactured by Rikua K. K., and shear was applied to the prepolymer at 47 revolutions/min (rpm) and 210° C. for approximately 2 minutes to give a cloudy crystallized prepolymer.

The crystallized prepolymer thus obtained had a heat absorption temperature range associated with crystal melting of at least 220° C. to at most 292° C. when using a DSC (Differential Scanning Calorimeter) with a temperature rise of 10° C./min, and a crystal heat of fusion of 12.8 J/g. Furthermore, the glass transition temperature was 122° C.

The above-mentioned crystallized prepolymer was pulverized into particles having a particle size of 0.84 mm, with particles having a particle size of 0.5 mm excluded. The specific surface area of these particles was 0.049 m$^2$/g.

A pressure of 200 kgf/cm$^2$ was applied to 0.2 g of the particles at 130° C. to form a strong compression molded body having a bulk density of 1.01 g/cm$^3$. The specific surface area of the compression molded body was 0.225 m$^2$/g, which was 4.6 times that prior to the compression.

The compression molded body was placed in a reactor having a vacuum distillation system, and heated under 66.7 Pa (0.5 mmHg) at 200° C. for 3 hours and at 220° C. for 4 hours to give a crystalline wholly aromatic polyester carbonate having a reduced viscosity of 0.89 dL/g and an upper limit of the heat absorption temperature range associated with crystal melting of 325° C. when using a DSC (Differential Scanning Colorimeter) with a temperature rise of 10° C./min.

Keeping this crystalline wholly aromatic polyester carbonate at 340° C. for 1 minute gave an amorphous wholly aromatic polyester carbonate having a reduced viscosity of 0.82 dL/g and a glass transition temperature of 194° C.

When the amorphous wholly aromatic polyester carbonate thus obtained was further analyzed using NMR, a wholly aromatic polyarylate component having an isophthalic acid- or terephthalic acid-2,2-bis(4-hydroxyphenyl)propane repeating unit and a wholly aromatic polycarbonate component derived from 2,2-bis(4-hydroxyphenyl)propane were observed, and the proportion of the second component was 10 mol relative to 100 mol of the first component. This demonstrates that the composition of the wholly aromatic polyester carbonate obtained was as expected from the composition initially charged, and it/ta was 0.43. With regard to the molecular terminal groups, the phenyl ester terminal group derived from the phenyl esters of diphenyl carbonate and the aromatic dicarboxylic acids, and the hydroxyphenyl terminal group derived from 2,2-bis(4-hydroxyphenyl)propane were observed at a ratio of 55/45, and the amount of phenyl carboxylic acid terminal group derived from the aromatic dicarboxylic acids was below the detection limit.

As hereinbefore described, a wholly aromatic polyester carbonate having a high degree of polymerization could be obtained quickly.

Example 11

A reactor equipped with a stirrer and a vacuum distillation system provided with a nitrogen inlet was charged with 46.5 parts of terephthalic acid, 19.9 parts of isophthalic acid, 100.4 parts of 2,2-bis(4-hydroxyphenyl)propane, 179.9 parts of diphenyl carbonate, and 0.084 parts of tetraphenoxytitanium, and a reaction started at 200° C.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.428$

After 30 minutes had passed, the temperature was increased to 220° C., and after confirming that phenol was distilling at this temperature, the pressure of the system was gradually decreased.

4 hours after starting the reaction, it was confirmed that the starting materials were uniformly dissolved. The temperature was then further increased and the pressure was decreased, and 6 hours after starting the reaction the system was at 290° C. and 133.4 Pa (about 10 mmHg).

Polymerization was carried out under the same conditions for 20 minutes to give a slightly yellow-colored transparent prepolymer. The reduced viscosity of the prepolymer obtained by this prepolymerization was 0.20 dL/g.

The above-mentioned prepolymer was placed in a single shaft extruder (RY45-30 JM7.5 1/15) manufactured by Rikua K. K., and shear was applied to the prepolymer at 48 rpm and 210° C. for approximately 2 minutes to give a cloudy crystallized prepolymer.

The reduced viscosity of the crystallized prepolymer thus obtained was 0.19 dL/g, the heat absorption temperature range associated with crystal melting was from at least 220° C. to at most 290° C. when using a DSC (Differential Scanning Calorimeter) with a temperature rise of 10° C./min, and the crystal heat of fusion was 10.8 J/g. Furthermore, the glass transition temperature was 128° C.

The above-mentioned crystallized prepolymer was pulverized into particles having a particle size of 0.84 mm, with particles having a particle size of 0.5 mm excluded. The specific surface area of these particles was 0.050 m$^2$/g.

A pressure of 200 kgf/cm$^2$ was applied to 0.2 g of the particles at 130° C. to give a strong compression molded body having a bulk density of 1.01 g/cm$^3$. The specific surface area of the compression molded body was 0.224 m$^2$/g, which was 4.5 times that prior to the compression.

The compression molded body was placed in a reactor having a vacuum distillation system, and heated under 66.7 Pa (0.5 mmHg) at 200° C. for 3 hours and at 220° C. for 4 hours to give a crystalline wholly aromatic polyester carbonate having a reduced viscosity of 0.91 dL/g and an upper limit of the heat absorption temperature range associated with crystal melting of 326° C. when using a DSC (Differential Scanning Calorimeter) with a temperature rise of 10° C./min. Keeping this crystalline wholly aromatic polyester carbonate at 340° C. for 3 minutes gave an amorphous wholly aromatic polyester carbonate having a reduced viscosity of 0.88 dL/g and a glass transition temperature of 193° C.

As hereinbefore described, a wholly aromatic polyester carbonate having a high degree of polymerization could be obtained quickly.

Example 12

A reactor equipped with a stirrer and a vacuum distillation system provided with a nitrogen inlet was charged with 46.5 parts of terephthalic acid, 19.9 parts of isophthalic acid, 100.4 parts of 2,2-bis(4-hydroxyphenyl)propane, 179.9 parts of diphenyl carbonate, 0.049 parts of dimethylaminopyridine, and 0.016 parts of potassium carbonate and a reaction started at 200° C.

The numerical values for the above-mentioned expressions (2) and (4), and the values of $X_1$ and $X_2$ were as follows.

$C/(A+B)=1.0$ $X_1=0.1$ $X_2=0.1$ $IA/TA=0.429$

After 30 minutes had passed, the temperature was increased to 220° C., and after confirming that phenol was distilling at this temperature, the pressure of the system was gradually decreased.

4 hours after starting the reaction, it was confirmed that the starting materials were uniformly dissolved. The temperature was then further increased and the pressure was decreased, and 6 hours after starting the reaction the system was at 300° C. and 133.4 Pa (about 10 mmHg).

Polymerization was carried out under the same conditions for 10 minutes to give a slightly yellow-colored transparent prepolymer. The reduced viscosity of the prepolymer obtained by this prepolymerization was 0.17 dL/g.

30 g of the above-mentioned prepolymer was pulverized into a particle size of 2 mm or below, 18 g of acetone was then added thereto, and kneading at 25° C. for 10 minutes gave a white opaque crystallized prepolymer.

The reduced viscosity of the crystallized prepolymer thus obtained was 0.17 dL/g, the heat absorption temperature range associated with crystal melting was from at least 205° C. to at most 283° C. when using a DSC (Differential Scanning Calorimeter) with a temperature rise of 10° C./min, and the crystal heat of fusion was 5.1 J/g. Furthermore, the glass transition temperature was 121° C.

The above-mentioned crystallized prepolymer was pulverized into particles having a particle size of 0.84 mm, with particles having a particle size of 0.5 mm excluded. The specific surface area of these particles was 0.048 m²/g.

A pressure of 200 kgf/cm² was applied to 0.2 g of the particles at 130° C. to give a strong compression molded body having a bulk density of 1.01 g/cm³. The specific surface area of the compression molded body was 0.226 m²/g, which was 4.7 times that prior to the compression.

The compression molded body was placed in a reactor having a vacuum distillation system, and heated under 66.7 Pa (0.5 mmHg) at 200° C. for 3 hours and at 220° C. for 4 hours to give a crystalline wholly aromatic polyester carbonate having a reduced viscosity of 0.84 dL/g and an upper limit of the heat absorption temperature range associated with crystal melting of 325° C. when using a DSC (Differential Scanning Calorimeter) with a temperature rise of 10° C./min.

Keeping this crystalline wholly aromatic polyester carbonate at 340° C. for 3 minutes gave an amorphous wholly aromatic polyester carbonate having a reduced viscosity of 0.76 dL/g and a glass transition temperature of 192° C.

As hereinbefore described, a wholly aromatic polyester carbonate having a high degree of polymerization could be obtained quickly.

What is claimed is:

1. A process for the production of a wholly aromatic polyester carbonate using three components:

an aromatic diol component (a) represented by formula (I) below $$HO—Ar^1—X—Ar^2—OH \tag{I}$$

{in formula (I), $Ar^1$ and $Ar^2$ are each phenylene groups, which may be substituted, and X is a divalent organic group represented by formula (II) below

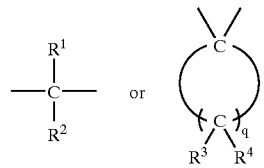

(here, $R^1$, $R^2$, $R^3$, and $R^4$ are each independently selected from the group consisting of a hydrogen atom, a halogen atom, an alkyl group having 1 to 6 carbons, a cycloalkyl group having 5 or 6 carbons, an aryl group having 6 to 12 carbons, and an aralkyl group having 7 to 12 carbons, q denotes an integer of 4 to 10, and q each of $R^3$ and $R^4$ may be identical or different)}, an aromatic dicarboxylic acid component (b), and a diaryl carbonate (c) in molar ratios that simultaneously satisfy expressions (1), (2), and (3) below $$A:B:C=(1+X_1):1:(2+X_2) \tag{1}$$

$$0.9 \leq C/(A+B) \leq 1.1 \tag{2}$$

$$0.5 \leq X_2/X_1 \leq 1.5 \tag{3}$$

(in the expressions, A denotes the number of moles of the aromatic diol component (a), B denotes the number of moles of the aromatic dicarboxylic acid component (b), and C denotes the number of moles of the diaryl carbonate (c); $X_1$ and $X_2$ denote any number that is larger than 0 and at most 0.5, and may be identical or different), characterized in that a high molecular weight polymer is obtained by carrying out, in sequence, 1) a prepolymerization step in which a prepolymer is prepared by prepolymerizing the three components: the above-mentioned aromatic diol component (a), the aromatic dicarboxylic acid component (b), and the diaryl carbonate (c) while heating at a temperature of at least 180° C. using, as the aromatic dicarboxylic acid component (b), terephthalic acid (b') alone or an aromatic dicarboxylic acid component mixture (b") of terephthalic acid and isophthalic acid at a molar ratio that satisfies expression (4) below $$0 \leq IA/TA < 1 \tag{4}$$

(in the expression, TA and IA are the numbers of moles of terephthalic acid and isophthalic acid, respectively), 2) a crystallization step in which the prepolymer is crystallized to prepare a crystallized prepolymer, and 3) a solid-phase polymerization step in which the degree of polymerization of the crystallized prepolymer is increased.

2. The process for the production of a wholly aromatic polyester carbonate according to claim 1 wherein in the prepolymerization step 1) the prepolymerization is carried out in the presence of a pyridine compound represented by formula (III) below

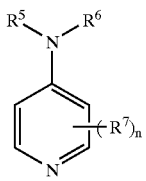

(III)

(in formula (III), $R^5$ and $R^6$ are independently selected from the group consisting of an alkyl group having 1 to 6 carbons, a cycloalkyl group having 5 to 10 carbons, an aryl group having 6 to 12 carbons, and an aralkyl group having 7 to 12 carbons, $R^5$ and $R^6$ may be bonded to each other and, together with the nitrogen atom to which they are bonded, form a 5 to 7 membered heterocyclic ring, $R^7$ is selected from the group consisting of an alkyl group having 1 to 6 carbons, a cycloalkyl group having 5 to 10 carbons, an aryl group having 6 to 12 carbons, and an aralkyl group having 7 to 12 carbons, and n denotes an integer of 0 to 4).

3. The process for the production of a wholly aromatic polyester carbonate according to claim 2 wherein in the crystallization step 2) the prepolymer is cooled from a molten state and crystallized at a temperature of at least 160° C. and at most 280° C. to give a crystallized prepolymer.

4. The process for the production of a wholly aromatic polyester carbonate according to claim 3 wherein in the prepolymerization step 1) the prepolymer is prepared so as to have a reduced viscosity in the range of 0.05 to 0.3 dL/g measured in a phenol/1,1,2,2-tetrachloroethane solvent mixture (ratio by weight 60/40) at a concentration of 1.2 g/100 mL and 35° C.

5. The process for the production of a wholly aromatic polyester carbonate according to claim 4 wherein in the prepolymerization step 1) an aromatic dicarboxylic acid component mixture (b″) of terephthalic acid and isophthalic acid is used as the aromatic dicarboxylic acid component (b) at a molar ratio that satisfies expression (5) below $$0.25 \leq IA/TA \leq 0.67 \quad (5)$$

(in the expression, TA and IA are the numbers of moles of terephthalic acid and isophthalic acid, respectively).

6. The process for the production of a wholly aromatic polyester carbonate according to claim 5 wherein in the crystallization step 2) shear is applied so that the crystallized prepolymer thus obtained becomes cloudy.

7. The process for the production of a wholly aromatic polyester carbonate according to claim 6 wherein in the crystallization step 2) shear is applied to the prepolymer at a rotational speed of greater than 0 and less than 60 rpm at a temperature from at least the glass transition temperature of the prepolymer to at most 280° C.

8. The process for the production of a wholly aromatic polyester carbonate according to claim 5 wherein in the crystallization step 2) the crystallized prepolymer is prepared so as to have a heat absorption temperature range associated with crystal melting of at least 180° C. to at most 320° C. when using a DSC (Differential Scanning Calorimeter) with a temperature rise of 10° C./min.

9. The process for the production of a wholly aromatic polyester carbonate according to claim 6 wherein in the crystallization step 2) the crystallized prepolymer is prepared so as to have a heat absorption temperature range associated with crystal melting of at least 180° C. to at most 320° C. when using a DSC (Differential Scanning Calorimeter) with a temperature rise of 10° C./min.

10. The process for the production of a wholly aromatic polyester carbonate according to claim 2 wherein in the crystallization step 2) the crystallized prepolymer is prepared by adding a crystallizing solvent to the prepolymer and mixing the prepolymer and the crystallizing solvent.

11. The process for the production of a wholly aromatic polyester carbonate according to claim 10 wherein in the prepolymerization step 1) the prepolymer is prepared so as to have a reduced viscosity in the range of 0.1 to 0.5 dL/g.

12. The process for the production of a wholly aromatic polyester carbonate according to claim 11 wherein the process further comprises, subsequent to the prepolymerization step 1), a pulverization step in which the prepolymer is pulverized, and in the crystallization step 2) the crystallizing solvent is added at 5 to 150 parts by weight relative to 100 parts by weight of the pulverized prepolymer, and the pulverized prepolymer and the crystallizing solvent are mixed.

13. The process for the production of a wholly aromatic polyester carbonate according to claim 10 wherein in the crystallization step 2) the prepolymer and the crystallizing solvent are mixed at a temperature that is at most the boiling point of the crystallizing solvent.

14. The process for the production of a wholly aromatic polyester carbonate according to claim 10 wherein in the crystallization step 2) acetone is used as the crystallizing solvent.

15. The process for the production of a wholly aromatic polyester carbonate according to claim 3 wherein the process further comprises, subsequent to the crystallization step 2), a compression molding step in which the crystallized prepolymer is made into a compression molded body by applying pressure to the crystallized prepolymer, and solid-phase polymerization is carried out using the compression molded body.

16. The process for the production of a wholly aromatic polyester carbonate according to claim 15 wherein the particle size of the crystallized prepolymer that is subjected to the compression molding step is in the range of 0.01 mm to 5 mm.

17. The process for the production of a wholly aromatic polyester carbonate according to claim 15 wherein in the compression molding step the bulk density of the compression molded body obtained is from at least 0.5 g/cm$^3$ to at most 1.5 g/cm$^3$, and the specific surface area is 1.1 to 20 times the specific surface area of the crystallized prepolymer immediately prior to the compression molding step.

18. The process for the production of a wholly aromatic polyester carbonate according to claim 15 wherein in the compression molding step the temperature of the crystallized prepolymer during the compression molding step or the temperature of the compression molded body obtained in the compression molding step is increased, at least temporarily, to at least the glass transition temperature of the prepolymer obtained in the prepolymerization step 1).

19. The process for the production of a wholly aromatic polyester carbonate according to claim 15 wherein the process further comprises, prior to the compression molding step, a pulverization step in which the crystallized prepolymer is pulverized.

20. The process for the production of a wholly aromatic polyester carbonate according to claim 10 wherein the process further comprises, subsequent to the crystallization step 2), a compression molding step in which the crystallized prepolymer is made into a compression molded body by applying pressure to the crystallized prepolymer, and solid-phase polymerization is carried out using the compression molded body.

21. The process for the production of a wholly aromatic polyester carbonate according to claim 20 wherein the particle size of the crystallized prepolymer that is subjected to the compression molding step is in the range of 0.01 mm to 5 mm.

22. The process for the production of a wholly aromatic polyester carbonate according to claim 20 wherein in the compression molding step the bulk density of the compression molded body obtained is from at least 0.5 g/cm³ to at most 1.5 g/cm³, and the specific surface area is 1.1 to 20 times the specific surface area of the crystallized prepolymer immediately prior to the compression molding step.

23. The process for the production of a wholly aromatic polyester carbonate according to claim 20 wherein in the compression molding step the temperature of the crystallized prepolymer during the compression molding step or the temperature of the compression molded body obtained in the compression molding step is increased, at least temporarily, to at least the glass transition temperature of the prepolymer obtained in the prepolymerization step 1).

24. The process for the production of a wholly aromatic polyester carbonate according to claim 20 wherein the process further comprises, prior to the compression molding step, a pulverization step in which the crystallized prepolymer is pulverized.

25. The process for the production of a wholly aromatic polyester carbonate according to claim 1 wherein in the solid-phase polymerization step 3) the solid-phase polymerization temperature is at least the glass transition temperature of the crystallized prepolymer and at most 260° C.

26. The process for the production of a wholly aromatic polyester carbonate according to claim 1 wherein the upper limit of the heat absorption temperature range associated with crystal melting of the wholly aromatic polyester carbonate when the solid-phase polymerization is completed is at most 360° C. when using a DSC (Differential Scanning Calorimeter) with a temperature rise of 10° C./min.

27. The process for the production of a wholly aromatic polyester carbonate according to claim 1 wherein in the prepolymerization step 1) the polymerization is carried out in the presence of a titanium compound represented by formula (IV) below $$\text{Ti}(OR^8)_p(OR^9)_m \tag{IV}$$

(in formula (IV) above, $R^8$ is selected from the group consisting of an alkyl group having 1 to 6 carbons, a cycloalkyl group having 5 to 10 carbons, and an aralkyl group having 7 to 12 carbons, $R^9$ is an aryl group having 6 to 12 carbons, and each of p and m is 0 or an integer of 1 to 4 such that p+m 4).

28. The process for the production of a wholly aromatic polyester carbonate according to claim 27 wherein in the crystallization step 2) the prepolymer is cooled from a molten state and crystallized at a temperature of at least 160° C. to at most 280° C. to give a crystallized prepolymer.

29. The process for the production of a wholly aromatic polyester carbonate according to claim 28 wherein in the prepolymerization step 1) the prepolymer is prepared so as to have a reduced viscosity in the range of 0.05 to 0.3 dL/g.

30. The process for the production of a wholly aromatic polyester carbonate according to claim 29 wherein in the prepolymerization step 1) an aromatic dicarboxylic acid mixture component (b″) of terephthalic acid and isophthalic acid is used as the aromatic dicarboxylic acid component (b) at a molar ratio that satisfies expression (3) below $$0.25 \leq IA/TA \leq 0.67 \tag{3}$$

(in the expression, TA and IA are the numbers of moles of terephthalic acid and isophthalic acid, respectively).

31. The process for the production of a wholly aromatic polyester carbonate according to claim 30 wherein in the crystallization step 2) shear is applied so that the crystallized prepolymer thus obtained becomes cloudy.

32. The process for the production of a wholly aromatic polyester carbonate according to claim 28 wherein the process further comprises, subsequent to the crystallization step 2), a compression molding step in which the crystallized prepolymer is made into a compression molded body by applying pressure to the crystallized prepolymer, and solid-phase polymerization is carried out using the compression molded body.

33. The process for the production of a wholly aromatic polyester carbonate according to claim 32 wherein in the compression molding step the temperature of the crystallized prepolymer during the compression molding step or the temperature of the compression molded body obtained in the compression molding step is increased, at least temporarily, to at least the glass transition temperature of the prepolymer obtained in the prepolymerization step 1).

34. The process for the production of a wholly aromatic polyester carbonate according to claim 32 wherein the process further comprises, prior to the compression molding step, a pulverization step in which the crystallized prepolymer is pulverized.

35. The process for the production of a wholly aromatic polyester carbonate according to claim 1 wherein in the crystallization step 2) the crystallized prepolymer is prepared so as to have a crystal melting point of at least 180° C. and a crystal heat of fusion of 0.5 to 60 J/g when using a DSC (Differential Scanning Calorimeter) with a temperature rise of 10° C./min.

36. The process for the production of a wholly aromatic polyester carbonate according to claim 1 wherein in the solid-phase polymerization step 3) the crystallized prepolymer is heated at a temperature in the range from at least the glass transition temperature of the prepolymer to a temperature that can maintain the crystallized prepolymer in a solid-phase state.

37. The process for the production of a wholly aromatic polyester carbonate according to claim 1 wherein the polymer having a high degree of polymerization has a reduced viscosity of at least 0.55 dL/g.

38. A wholly aromatic polyester carbonate characterized in that a repeating unit represented by formula (V) below

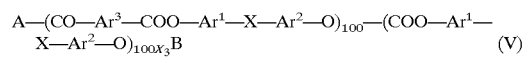

{in formula (V), $Ar^1$ and $Ar^2$ are each phenylene groups, which may be substituted, $Ar^3$ is an aromatic group, which may be substituted, X is a divalent organic group represented by formula (II) below

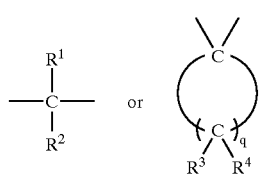

(here, $R^1$, $R^2$, $R^3$, and $R^4$ are each independently selected from the group consisting of a hydrogen atom, a halogen atom, an alkyl group having 1 to 6 carbons, a cycloalkyl group having 5 or 6 carbons, an aryl group having 6 to 12 carbons, and an aralkyl group having 7 to 12 carbons, q denotes an integer of 4 to 10, and q each of $R^3$ and $R^4$ may be identical or different), and $X_3$ is a number greater than 0 and at most 0.5},
is random copolymerized, and terminal groups A and B of the molecule are groups selected from the group consisting of an aryloxy group, which may be substituted with a halogen atom or a methyl group, a hydroxyaryl group, which may have a substituent, and a carboxyaryl group, which may be substituted.

39. The wholly aromatic polyester carbonate according to claim 38 wherein in formula (V) $Ar^3$ is a p-phenylene group alone or a mixture of a p-phenylene group and a m-phenylene group that satisfies expression (α) below $$0 \leq ia/ta < 1 \tag{α}$$

(in the expression, ia and ta denote the mole fractions of the m-phenylene group and the p-phenylene group respectively relative to all of the $Ar^3$).

40. The wholly aromatic polyester carbonate according to claim 39 wherein in formula (V) $Ar^3$ is a mixture of a m-phenylene group and a p-phenylene group that satisfies expression (β) below $$0.25 \leq ia/ta \leq 0.67 \tag{β}$$

(in the expression, ia and ta denote the mole fractions of the m-phenylene group and the p-phenylene group respectively relative to all of the $Ar^3$).

* * * * *